United States Patent
Kusaba et al.

(10) Patent No.: US 9,357,176 B2
(45) Date of Patent: May 31, 2016

(54) METHOD AND APPARATUS FOR DISPLAYING PROGRAM GUIDE INFORMATION IN AVAILABLE BLANK REGIONS

(75) Inventors: Daisuke Kusaba, Osaka (JP); Tatsuaki Mitsumata, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1225 days.

(21) Appl. No.: 12/446,811

(22) PCT Filed: Jul. 10, 2008

(86) PCT No.: PCT/JP2008/001844
§ 371 (c)(1),
(2), (4) Date: Apr. 23, 2009

(87) PCT Pub. No.: WO2009/008171
PCT Pub. Date: Jan. 15, 2009

(65) Prior Publication Data
US 2010/0011396 A1    Jan. 14, 2010

(30) Foreign Application Priority Data

Jul. 11, 2007 (JP) .................................. 2007-181923

(51) Int. Cl.
| | |
|---|---|
| G06F 17/00 | (2006.01) |
| H04N 7/173 | (2011.01) |
| H04N 5/445 | (2011.01) |
| H04N 5/50 | (2006.01) |
| H04N 21/431 | (2011.01) |
| G06F 3/12 | (2006.01) |
| H04N 21/482 | (2011.01) |

(52) U.S. Cl.
CPC ................ *H04N 7/173* (2013.01); *G06F 3/125* (2013.01); *G06F 3/1205* (2013.01); *G06F 3/1253* (2013.01); *G06F 3/1284* (2013.01); *H04N 5/44543* (2013.01); *H04N 5/50* (2013.01); *H04N 21/4312* (2013.01); *H04N 21/4314* (2013.01); *H04N 21/482* (2013.01); *G06F 3/1242* (2013.01); *H04N 21/4821* (2013.01)

(58) Field of Classification Search
CPC .............. H04N 21/4821; H04N 21/84; H04N 21/4532; H04N 21/47; H04N 5/44543
USPC ......................................................... 715/277
See application file for complete search history.

(56) References Cited

U.S. PATENT DOCUMENTS

| | | | |
|---|---|---|---|
| 6,925,509 B2 | 8/2005 | Ihara | |
| 7,089,976 B2* | 8/2006 | Bargy | ........................... 141/340 |
| 7,568,167 B2* | 7/2009 | Van Dok et al. | .............. 715/789 |
| 7,620,969 B2 | 11/2009 | Shibamiya | |
| 7,814,406 B2 | 10/2010 | Ozawa | |
| 7,921,370 B1* | 4/2011 | Legault | ......................... 715/762 |

(Continued)

FOREIGN PATENT DOCUMENTS

| | | |
|---|---|---|
| JP | 2000-253325 A | 9/2000 |
| JP | 2000253325 A | 9/2000 |

(Continued)

*Primary Examiner* — Shawn S Joseph
(74) *Attorney, Agent, or Firm* — RatnerPrestia

(57) ABSTRACT

A program guide printing device receives program information and generates program guide print data from the received program information. The program guide printing device prints a program guide. In a program frame of a program guide, a blank region may occur. In the blank region, the program guide printing device can print program information of another program or additional information such as advertisement information, program topics, weather forecast, text and images.

8 Claims, 21 Drawing Sheets

(56) References Cited

U.S. PATENT DOCUMENTS

| | | |
|---|---|---|
| 2002/0051160 A1 | 5/2002 | Ihara |
| 2004/0128684 A1 | 7/2004 | Suga |
| 2004/0148629 A1 | 7/2004 | Shibamiya |
| 2004/0175121 A1* | 9/2004 | Ellis et al. ............... 386/83 |
| 2006/0023116 A1* | 2/2006 | Kunieda et al. ........... 348/441 |
| 2006/0236233 A1 | 10/2006 | Ozawa |
| 2009/0037267 A1* | 2/2009 | Duggal et al. ............. 705/14 |

FOREIGN PATENT DOCUMENTS

| | | |
|---|---|---|
| JP | 2001-211401 A | 8/2001 |
| JP | 2001-223968 A | 8/2001 |
| JP | 2001211401 A | 8/2001 |
| JP | 2001223968 A | 8/2001 |
| JP | 2004-172839 A | 6/2004 |
| JP | 2004172839 A | 6/2004 |
| JP | 2004-194250 A | 7/2004 |
| JP | 2004-208294 A | 7/2004 |
| JP | 2004194250 A | 7/2004 |
| JP | 2004208294 A | 7/2004 |
| WO | WO 2006/049150 A1 | 5/2006 |
| WO | WO-2006049150 A1 | 5/2006 |
| WO | PCT/JP2008/001844 | 10/2008 |

* cited by examiner

FIG. 8A

| | 4ch AAA | 6ch BBB | 8ch CCC |
|---|---|---|---|
| 20:00 | 20:00 ***<br>********<br><br>********<br>********<br>********<br>********<br>********<br>********<br>* | ****<br>***  <br><br><br>20:30 ***<br>********<br>** *<br>********<br>*****<br>********<br>*<br>****<br>******** | 19:54 *<br>********<br>** *<br>********<br>*****<br>******<br><br>20:45<br>********<br>* *<br>******<br>********<br>******** |
| 21:00 | 21:20 ***<br>*<br>**********<br><br>**<br>**** | | |
| 22:00 | 22:00 ******<br><br>********<br>***<br>*****<br>******* | Blank<br><br>22:45 * | 22:00 ***<br><br>**<br>*****<br>***<br>*****<br>********* |

| | 4ch AAA | 6ch BBB | 8ch CCC |
|---|---|---|---|
| 20:00 | 20:00 ***<br>*********<br><br>*********<br>*********<br>*********<br>*********<br>*********<br>*********<br>* | 20:00 *****<br>***  <br>*****<br>*********<br>20:30 <br>*****<br>*  <br>*****<br>****** | 19:54 *<br>*********<br>** *<br>*********<br>*****<br>******* |
| 21:00 | 21:20 ***<br>*<br>***********<br><br>**<br>** | 20:54 *<br>*********<br>** *<br>*********<br>* | 20:45<br>*********<br>* *<br>******<br>*********<br>******** |
| 22:00 | 22:00 ******<br><br>*********<br>***<br>*****<br>****** | Blank<br><br>22:45 * | 22:00 ***<br><br>**<br>*****<br>***<br>*****<br>******** |

FIG. 13A

| | 4ch AAA | 6ch BBB | 8ch CCC |
|---|---|---|---|
| 20:00 | 20:00 ***<br>*********<br>*********<br>*********<br>*********<br>*********<br>*********<br>*********<br>* | 20:00 *****<br>***  <br>*****<br>*******<br>20:30 <br>*****<br>*  <br>*****<br>****** | 19:54 *<br>********<br>** *<br>********<br>*****<br>******<br>20:45<br>********<br>* *<br>******** |
| 21:00 | 21:20 ***<br>*<br>***********<br><br>**<br>** | 20:54 *<br>********<br>** *<br>********<br>*<br>********<br>********<br>********<br>********<br>******** | **********<br>******** |
| 22:00 | 22:00 *****<br>*********<br>***<br>*****<br>******* | ********<br>********<br>********<br>********<br>22:45 * | 22:00 ***<br>**<br>*****<br>***<br>*****<br>********* |

1260, 1201, 1202

METHOD AND APPARATUS FOR DISPLAYING PROGRAM GUIDE INFORMATION IN AVAILABLE BLANK REGIONS

This application is a U.S. National Phase Application of PCT International Application PCT/JP2008/001844.

TECHNICAL FIELD

The present invention relates to a program guide printing device having a function of receiving program information and a method of printing a program guide using the program guide printing device.

BACKGROUND ART

In television broadcasting, regardless of analog or digital, program information is generally superimposed in addition to video/audio signals. Thus, receiving devices capable of receiving and analyzing such information and displaying it on a display section in a form of an electronic program guide or other forms have been widespread.

For example, program information of an electronic program guide includes basic program information such as a program name, performers, and genres, as well as detailed program information such as a plot and a related URL. Furthermore, in the electronic program guide, a program frame is formed for each program on the display section, and basic program information is displayed in the frame. Use of an electronic program guide generally realizes a function of displaying program information of a program to be selected when a television receiver receives a user's operation. Therefore, a user can refer to more information.

Such program information in a form of an electronic program guide is displayed not only on the display section. Technologies of printing such program information on paper and the like by using a printing device have been developed (for example, described in patent document 1 or 2). In other words, a device of printing more information than that on the display section by using an advantage of the printing device capable of expression with higher resolution has been developed.

When an electronic program guide is printed on paper and the like for reference, portability and easy reference for a user are improved. However, unlike a program guide printing device, printed materials cannot realize a function of displaying necessary information when it is needed by, for example, an operation with a remote control.

Furthermore, patent document 2 has proposed a technology of laying out an electronic program guide in a way in which it falls within the predetermined number of pages of paper by adjusting the font size when the program guide is printed. Therefore, this technology permits displaying a larger amount of information statically. However, the invention of this document treats information that is highly useful to a user and information that is less useful to a user in the same way, and visibility may be deteriorated due to the decrease in the font size.

[Patent document 1] Japanese Patent Unexamined Publication No.
[Patent document 2] Japanese Patent Unexamined Publication No. 2004-208294

SUMMARY OF THE INVENTION

A program guide printing device includes a tuner for receiving and channel-selecting a broadcast wave; a TS decoder for decoding the broadcast wave channel-selected by the tuner and extracting program information; and a storage section for storing the program information extracted by the TS decoder. Furthermore, the program guide printing device includes a printing control section for generating and outputting program guide print data from the program information stored in the storage section. The program guide print data includes a broadcasting time display frame for displaying a broadcasting time, a channel display frame for displaying each channel, and a program frame for displaying program information of each program. When the program frame for printing the program information in the program guide print data has a blank region, the printing control section prints program information of another program frame.

A program guide printing device includes a tuner for receiving and channel-selecting a broadcast wave; a TS decoder for decoding the broadcast wave channel-selected by the tuner and extracting program information; and a storage section for storing the program information extracted by the TS decoder. Furthermore, the program guide printing device includes a printing control section for generating and outputting program guide print data from the program information stored in the storage section. The program guide print data includes a broadcasting time display frame for displaying a broadcasting time, a channel display frame for displaying each channel, and a program frame for displaying program information of each program. Furthermore, it includes a preference judging section for storing preference information generated from a viewing history in the storage section, and calculating a recommendation degree of the program displayed in the program guide printing data. The printing control section may generate program guide print data for printing program information of another program frame in a slave program frame of program information of a program having a recommendation degree lower than the threshold value calculated in the preference judging section.

With such a configuration, in printing of an electronic program guide, program information of another program that is more useful to a user is printed in a blank region or a program frame for printing program information that is less useful to a user. Thus, it is possible to print a larger amount of useful information on a limited printing object such as paper.

Furthermore, in a method of printing a program guide using a program guide printing device, a printing control section may determine a print region based on a printing request; obtain basic program information of a program to be printed from the storage section; determine a layout of a program guide including a region of a displayed frame for displaying the information of each program; calculate a size of a blank region of a slave program frame having the blank region; retrieve for a master program frame having a larger amount of program information, which is adjacent to the slave program frame; and print the program information of the master program frame in the blank region of the slave program frame.

With such a method, in printing of an electronic program guide, program information of another program that is more useful to a user is printed in a program frame for printing program information that is less useful to a user or in a blank region. Thus, it is possible to print a larger amount of useful information on a limited printing object such as paper.

In addition, in a method of printing a program guide using a program guide printing device, a printing control section may determine a print region based on a printing request; obtain basic program information of a program to be printed from the storage section; determine a layout of a program guide including a region of a displayed frame for displaying the information of each program; calculate a size of a blank region of a slave program frame. Then, to the slave program frame whose recommendation degree is a threshold value or less, by retrieving for a master program frame having a larger amount of program information, program information of the master program frame may be printed in the slave program frame.

BRIEF DESCRIPTION OF THE DRAWINGS

FIG. 8A is a conceptual diagram showing a program guide printed image before program frames are related to each other in accordance with a fifth exemplary embodiment of the present invention.

FIG. 10A is a conceptual diagram of a program guide printed image in which program frames to be related are apart from each other.

FIG. 13A is a conceptual diagram of a program guide printed image in which program frames to be related are apart from each other.

Figure 1:
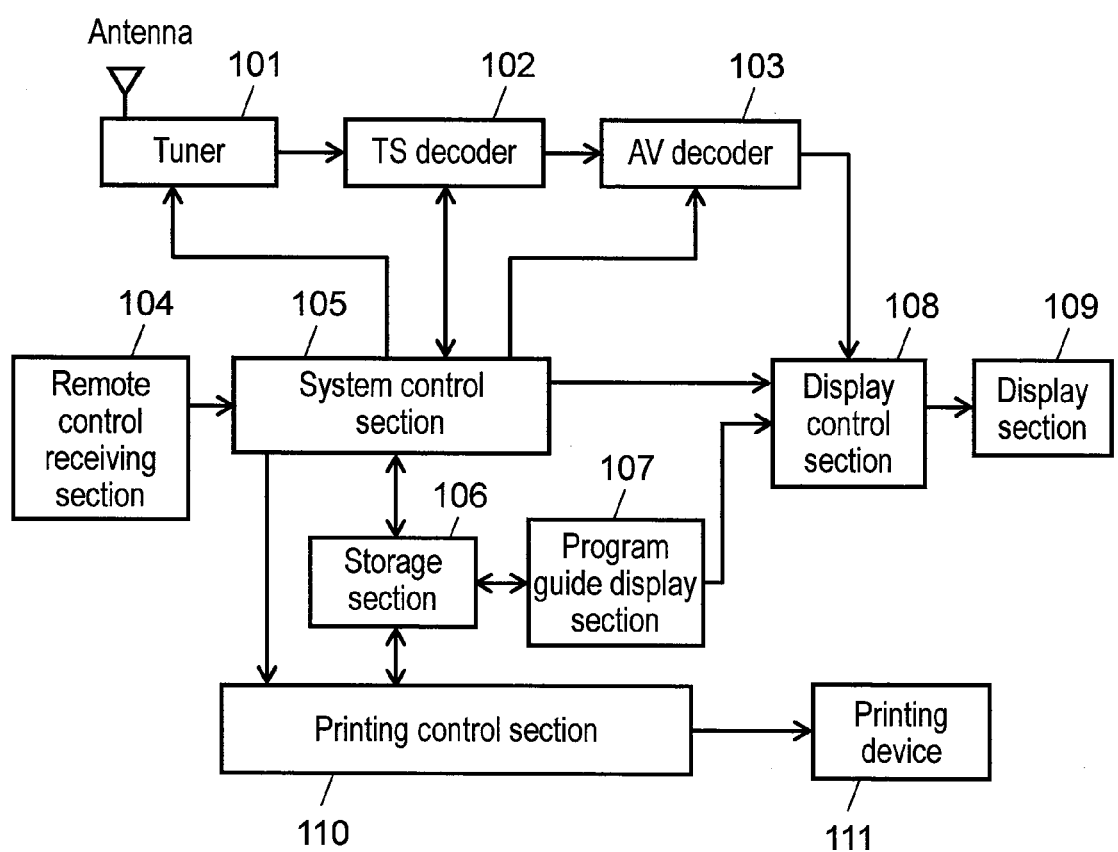
FIG. 1 is a block diagram showing a configuration of a program guide printing device in accordance with a first exemplary embodiment of the present invention.

REFERENCE MARKS IN THE DRAWINGS 101 tuner
102 TS decoder
103 AV decoder
104 remote control receiving section
105 system control section
106 storage section
107 program guide display section
108 display control section
109 display section
110 printing control section
111 printing device
401 slave program frame
402 master program frame
403 blank region
404 program frame
405 program frame
407 program frame
408 balloon
450 broadcasting time display frame
452 channel display frame
454 program frame
460 program guide printed image
462 program guide printed image
464 program guide printed image
501 preference judging section
701 program frame
702 program frame
703 blank region
705 program frame
706 blank region
760 program guide printed image
762 program guide printed image
901 program frame
902 program frame
903 blank region
904 program frame
906 balloon
907 program frame
909 blank region
960 program guide printed image
962 program guide printed image
964 program guide printed image
1001 printing object
1002 program frame
1003 program frame
1004 program frame
1060 program guide printed image
1062 program guide printed image
1260 program guide printed image
1262 program guide printed image
1264 program guide printed image

DETAILED DESCRIPTION OF THE PREFERRED EMBODIMENTS

Hereinafter, the exemplary embodiments of the present invention are described with reference to drawings.

(First Exemplary Embodiment)

Hereinafter, with reference to drawings, a first exemplary embodiment of the present invention is described. FIG. 1 is a block diagram showing a configuration example of a program guide printing device in accordance with the first exemplary embodiment of the present invention. In this exemplary embodiment, a device for obtaining program information from a broadcast wave is described. However, program information may be obtained from a cable broadcast or the Internet.

Tuner 101 receives a broadcast wave under the control of system control section 105. Then, tuner 101 channel-selects and demodulates the broadcast wave and sends a demodulated transport stream to TS decoder 102.

TS decoder 102 decodes the transport stream output from tuner 101 under the control of system control section 105. TS decoder 102 sends a video or audio packet obtained by decoding the transport stream to AV decoder 103. Furthermore, TS decoder 102 submits necessary data in the transport stream to system control section 105. That is to say, TS decoder 102 decodes the broadcast wave channel-selected by tuner 101 and extracts program information.

AV decoder 103 decodes video and audio packets output from TS decoder 102 to video audio signal. AV decoder 103 sends the decoded video audio signal to display control section 108.

Display control section 108 synthesizes the video audio signal from AV decoder 103 and the video signal from program guide display section 107, and outputs the synthesized signal to display section 109. A loudspeaker for outputting audio is also included in display section 109.

Remote control receiving section 104 receives a user operation via a remote control. Then, remote control receiving section 104 sends the received contents to system control section 105. The user operation via a remote control permits operations of designating a channel and a time slot to be displayed in the program guide to be printed, starting printing, and the like, in addition to a general channel-selecting operation, and the like.

Storage section 106 stores program information in the transport stream received via system control section 105. That is to say, storage section 106 stores program information extracted by TS decoder 102. The program information includes basic information such as a program name, performers, a genre, a channel and broadcasting time, as well as detailed program information such as a plot, related URL, and related images. The program information may be information for one day or information for several days.

Program guide display section 107 generates a video signal to be displayed from all or a part of the program information stored in storage section 106 under the control of system control section 105. Then, program guide display section 107 sends this video signal to be displayed to display control section 108.

Printing control section 110 reads out program information from storage section 106 under the control of system control section 105, and generates program guide print data. That is to say, printing control section 110 generates and outputs the program guide print data from the program information stored in storage section 106. The program guide print data includes a broadcasting time display frame for displaying a broadcasting time, a channel display frame for displaying each channel, and a program frame for displaying program information of each program. Then, printing control section 110 sends the program guide print data to printing device 111. Detail description of generating the program guide print data by printing control section 110 is described later.

The program guide printing device in accordance with the first exemplary embodiment is characterized by printing program information of another program in a blank region when the program guide print data include a blank region in its slave program frame displaying program information. Note here that the slave program frame means a program frame in which program information of another program frame is printed. Furthermore, another program frame printing program information in the slave program frame is referred to as a master program frame.

Figure 2:
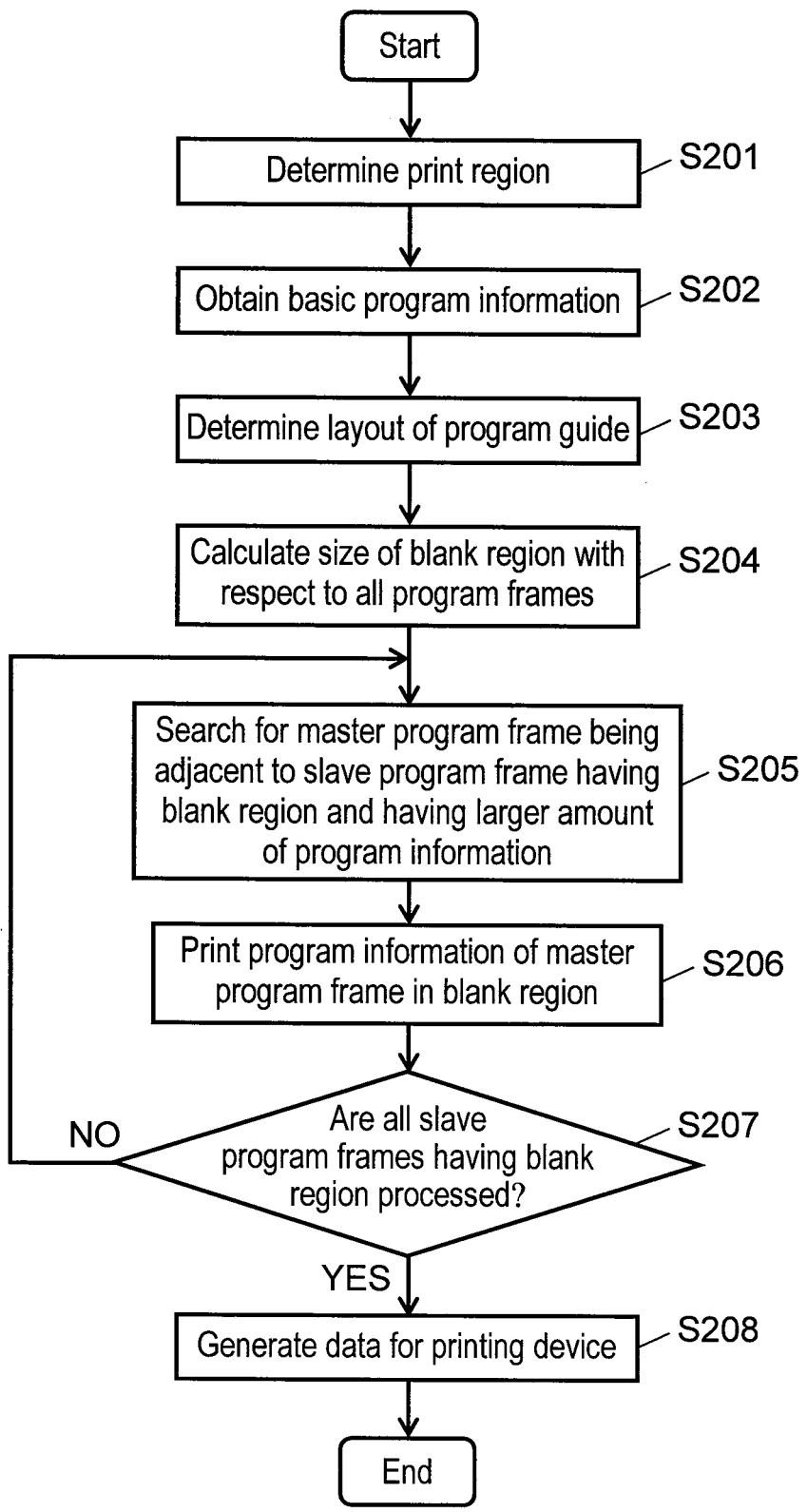
FIG. 2 is a flowchart showing a processing procedure of printing a program guide by the program guide printing device in accordance with the first exemplary embodiment of the present invention.

The control flow of the program guide printing device is described with reference to FIG. 2. FIG. 2 is a flowchart showing a processing procedure of printing a program guide by the program guide printing device in accordance with the first exemplary embodiment of the present invention. The processing procedure of printing a program guide by the program guide printing device is described in detail with reference to FIG. 2.

Firstly, when a user requests to print a program guide by a remote control operation, system control section 105 interprets the request. Then, system control section 105 issues a printing request to printing control section 110. At this time, based on the printing request, printing control section 110 receives information about a channel or a time slot to be printed from storage section 106 and determines a print region (S201).

Next, based on a time and a channel to be printed, printing control section 110 obtains basic program information of a program to be printed from storage section 106 (S202). Then, printing control section 110 determines a layout of a program guide including a region of a display frame for displaying information of each program (S203). The information of the layout is temporarily managed in, for example, storage section 106 in a list structure shown in FIG. 3. In this list, a program is managed for each channel, and each program possesses program information and a region for displaying the information as a coordinate.

Figure 3:
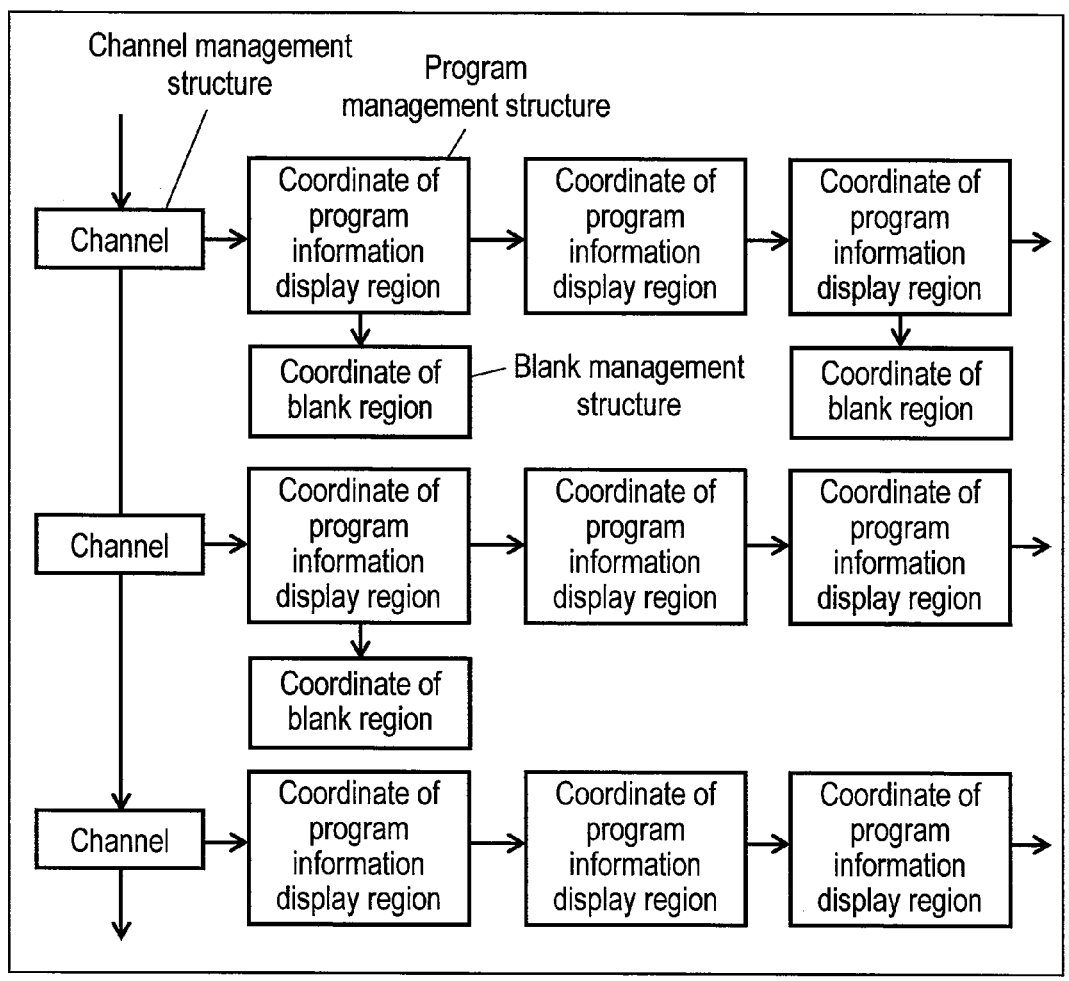
FIG. 3 shows an example of a data structure used in forming program guide print data.

Specifically, as shown in FIG. 3, in this example, a channel management structure is allowed to store the channel number and the like. On the channel management structure of one channel, program management structures are allowed to be dependent successively, and the program management structure stores program information display region coordinate possessing program information and a region for displaying the program information as a coordinate. Furthermore, when the program frame includes a blank region, program management structure allows the blank structure to depend thereon. The blank structure stores a coordinate of the blank region, size of the blank region, and the like.

The display region of each program is determined based on a broadcasting time in the basic program information and a time slot of the program guide to be printed. Therefore, a blank region may be generated due to the size of the basic program information. Then, printing control section 110 discriminates whether or not a blank is generated. That is to say, printing control section 110 discriminates the number of characters that can be displayed from the size of the program frame and the displaying font size. Then, printing control section 110 compares the resultant number of characters that can be displayed with the actual number of characters of the basic program information of the corresponding program frame. When the number of characters that can be displayed is larger than the actual number of characters, printing control section 110 judges that a blank is included in the program frame. Then, printing control section 110 calculates the size of the blank region of the slave program frame having the blank region (S204).

The size of this blank region is managed by, for example, a blank management structure related to each of the program management structures in the list shown in FIG. 3. The calculation of this blank region is carried out with respect to all the program frames to be printed. Such a program frames having a blank region is referred to as a slave program frame. Subsequently, printing control section 110 discriminates which program information is printed in the blank region. That is to say, by searching the list shown in FIG. 3, one slave program frames having a blank region is taken. However, when the size of the blank region is small, the effect is low. Therefore, a threshold value for judging the usable region is provided and only a program frame having a blank region that is not smaller than the threshold value may be extracted.

Subsequently, printing control section 110 searches a program frame adjacent to the slave program frame. The "adjacent" means a state in which broadcasting is carried out in a channel neighboring the channel of the program frame having a blank region and a part or entire of the broadcasting time slot is overlapped. As information for determining more useful program in such a program frame, in this exemplary embodiment, the amount of program information is used as a reference. Specifically, a master program frame that is adjacent to the slave program frames having a blank region and that has a larger amount of program information is retrieved (S205). Herein, among the program frames in which the actual number of characters is larger than the number of characters that can be displayed, a program frame having the largest actual number of characters is assumed to be a master program frame.

After the master program frame is specified, program information of the master program frame is printed in the blank region of the slave program frame (S206). Therefore, the blank management structure is placed under the management of the master program frame.

In order to show a state in which a blank region of the slave program frame is combined with the master program frame, for example, printing control section 110 carries out printing without printing a dividing line between the combined frames in this the exemplary embodiment.

Next, printing control section 110 determines whether or not the above-mentioned processing is carried out with respect to all the slave program frames having a blank region (S207). Then, in the case of "YES," printing control section 110 generates data for the printing device (S208). Next, printing control section 110 sends the data for the printing device to the printing device so as to print a program guide. Furthermore, in the case of "NO," the processing procedure returns to step S205 to search a program frame being adjacent to the slave program frame and having a larger amount of program information.

Figure 4A:
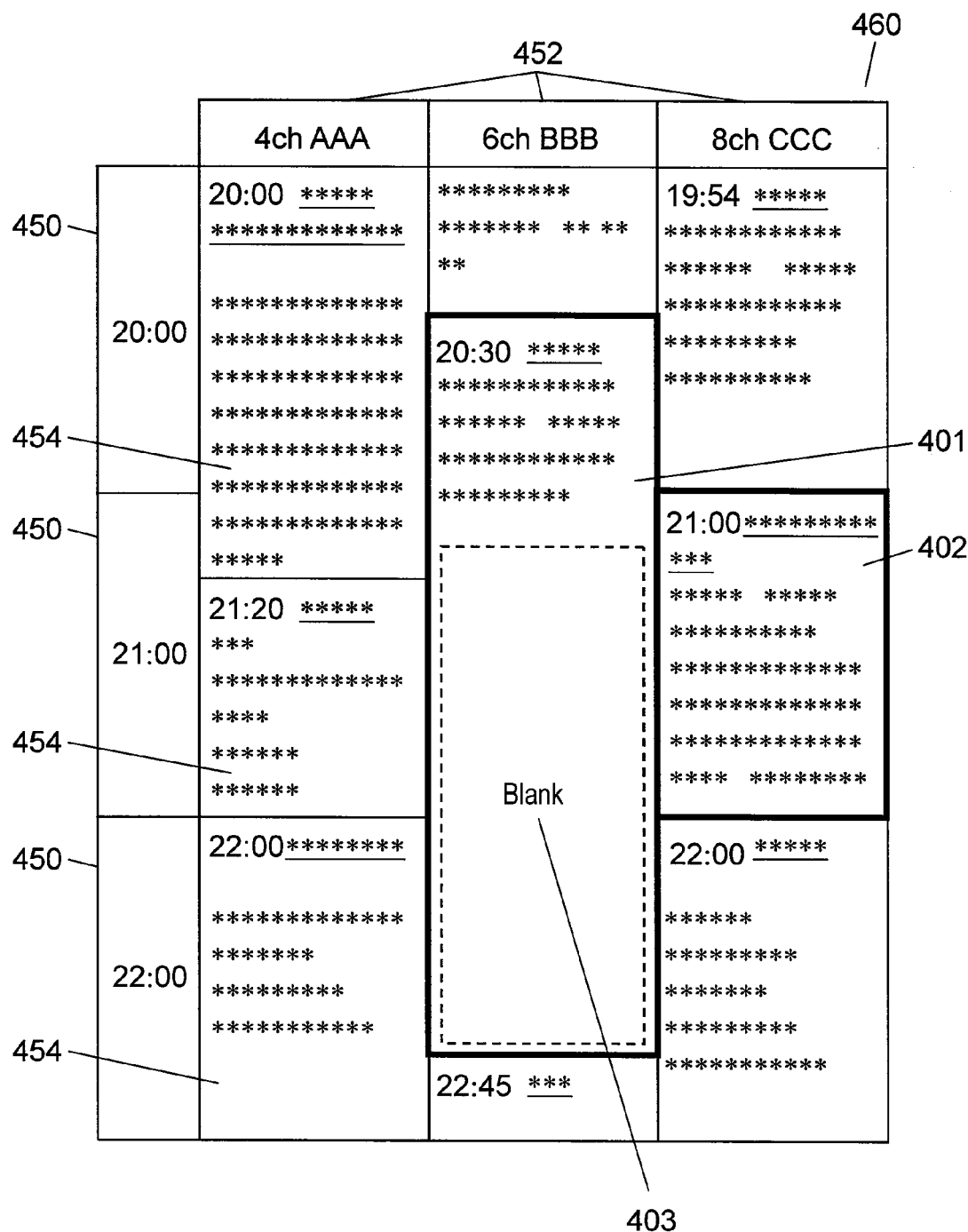
FIG. 4A is a conceptual diagram of a program guide printed image before adjacent program frames are combined.
Figure 4B:
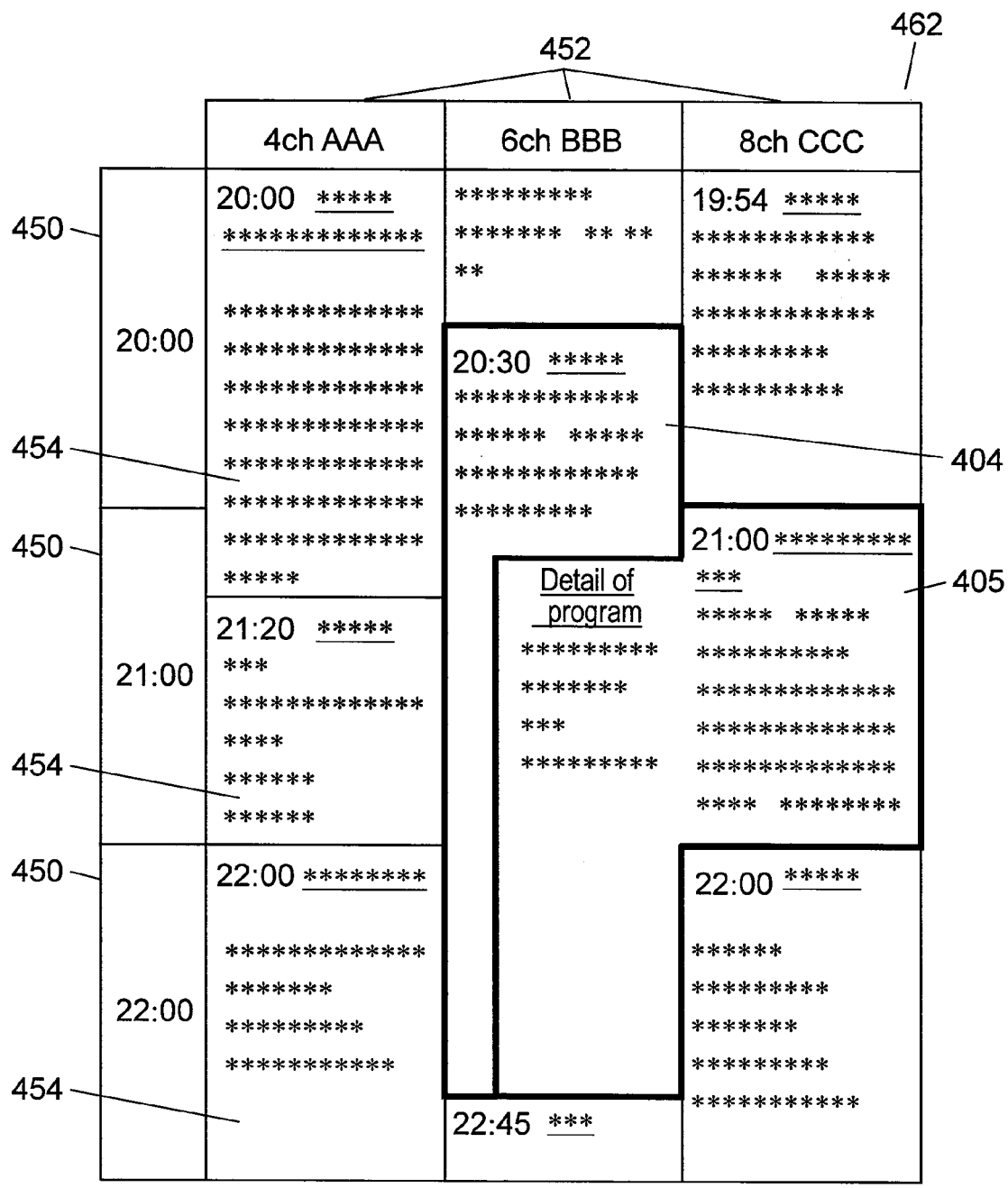
FIG. 4B is a conceptual diagram of a program guide printed image in which the combination of the adjacent program frames is expressed by not printing a dividing line between the combined frames.
Figure 4C:
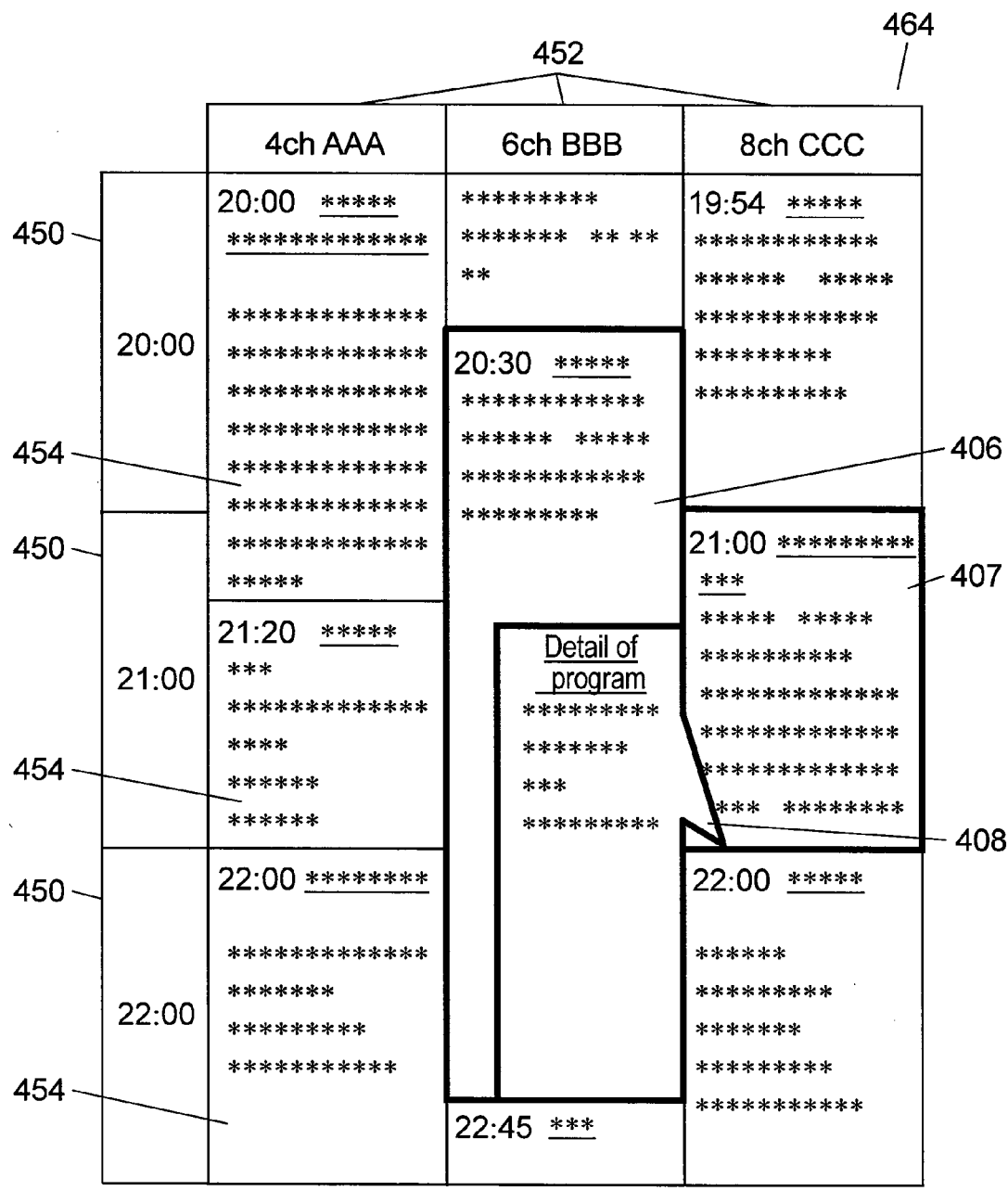
FIG. 4C is a conceptual diagram of a program guide printed image in which the combination of the adjacent program frames is expressed by using a balloon.

Next, by using conceptual diagrams of program guide printed images 460, 462, and 464 respectively shown in FIGS. 4A, 4B and 4C, the above-mentioned flow is described. FIG. 4A is a conceptual diagram showing program guide printed image 460 before the adjacent program frames are combined. FIG. 4B is a conceptual diagram showing program guide printed image 462 in which the combination of the adjacent program frames is expressed by not printing the dividing line between the combined frames. FIG. 4C is a conceptual diagram showing program guide printed image 464 in which the combination of the adjacent program frames is expressed by using balloon 408.

As shown in FIG. 4A, a left frame shows broadcasting time display frame 450 displaying a broadcasting time of each program. Furthermore, an upper frame, for example, "4ch AAA" is channel display frame 452 displaying each channel. FIG. 4A shows program frame 454 displaying program information of each program as an example. Furthermore, program guide print data are expressed by the specific printed example as program guide printed image 460. Note here that the program guide print data sent by printing control section 110 to printing device 111 may be data of a digital signal or data of an analog signal. That is to say, a method of exchanging data between printing control section 110 and printing device 111 may be previously determined so that printing device 111 can print data as shown in the conceptual diagram of program guide printed image 460.

In the control in step S205 shown in FIG. 2, slave program frame 401 having blank region 403 in FIG. 4A is assumed to be searched. Next, in the control in step S206 shown in FIG. 2, a program frame being adjacent to slave program frame 401 and having a larger amount of program information in FIG. 4A is searched. As a result, master program frame 402 in FIG. 4A is searched, and blank region 403 becomes a region for printing program information of master program frame 402.

As the printed result, slave program frame 401 in FIG. 4A is printed in a form in which blank region 403 is excluded as shown in program frame 404 in FIG. 4B. Furthermore, master program frame 402 in FIG. 4A is combined with blank region 403. Then, master program frame 402 in FIG. 4A is printed as an expanded frame like program frame 405 as shown in FIG. 4B. As a result, program information of master program frame 402 is printed in blank region 403. As shown in program frame 405, the combined program frame is expressed by printing without displaying a dividing line of channels between the combined program frames.

As mentioned above, printing control section 110 generates program guide print data for printing program information of master program frame 402 being adjacent to slave program frame 401 and having a larger amount of program information in black region 403 of slave program frame 401 having the blank region. Therefore, in printing of the electronic program guide, by printing program information of a program that is more useful to a user in a blank region that is less useful to a user, it is possible to print a larger amount of useful information in a limited printing object such as paper.

FIG. 4C is a conceptual diagram showing program guide printed image 464 in which the combination of the adjacent program frames is expressed by using balloon 408. The case where the combination of the adjacent program frames is expressed by using balloon 408 is described later.

Furthermore, the printing control section may not necessarily search all the program frames. For example, the printing control section may search only limited program frames included in the program guide print data to be printed. Furthermore, the printing control section may search only limited program frames to be displayed. This can shorten the time required for retrieval.

(Second Exemplary Embodiment)

Figure 5:
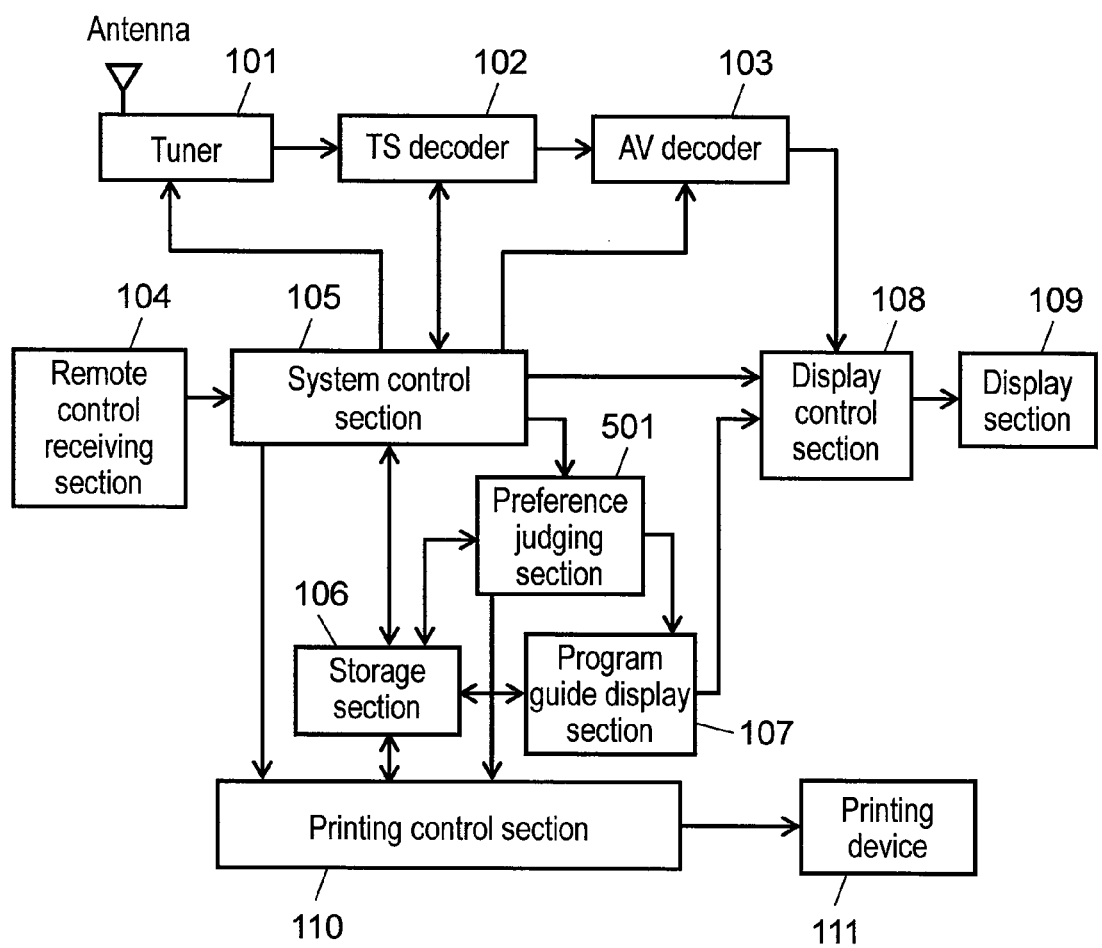
FIG. 5 is a block diagram showing a program guide printing device in accordance with the second exemplary embodiment of the present invention.

A program guide printing device in accordance with a second exemplary embodiment of the present invention is described with reference to drawings. FIG. 5 is a block diagram showing a configuration of a program guide printing device in accordance with the second exemplary embodiment. As shown in FIG. 5, the program guide printing device in this exemplary embodiment is different from the program guide printing device in the first exemplary embodiment shown in FIG. 1 in that preference judging section 501 is further provided. Other configurations and operations are the same as each other, the same reference numerals are given to the same configurations and operations and detail description thereof is omitted.

As shown in FIG. 5, the program guide printing device of this exemplary embodiment further includes preference judging section 501 for calculating the recommendation degree of the programs to be displayed in the program guide print data. Furthermore, storage section 106 stores preference information generated from a viewing history. Preference judging section 501 obtains program information of a program viewed by a user from storage section 106 under the control of system control section 105. Then, preference judging section 501 accumulates data for analyzing preference (hereinafter, referred to as "preference information") in storage section 106. Furthermore, preference judging section 501 analyzes a program suitable for user's preference from the accumulated preference information and program information.

Then, based on the analysis results, preference judging section 501 can calculate a recommendation degree of each program. That is to say, in order to calculate the recommendation degree of a program, for example, a method of appropriately weighing and adding the number of times and period of time of viewing a program, or the number of times of switching channels, number of times of recording a program, and the like, may be used. Alternatively, a method of appropriately weighing and adding the same items of a program of the same genre as the program as mentioned above may be used. Then, preference judging section 501 outputs the recommendation degree of each program to storage section 106, program guide display section 107, and printing control section 110.

Furthermore, the recommendation degree of a program may be normalized so that the maximum value is 100 and the half thereof, i.e. 50 may be made to be a threshold value. By providing a threshold value, when the recommendation degree of a program is large and is a threshold value or more, it may be determined that the recommendation degree of the program is high. Alternatively, when the recommendation degree of a program is smaller than the threshold value, it may be determined that the recommendation degree of the program is low.

When program information of another program is printed in a slave program frame having a blank region, in the first exemplary embodiment, the program frame having a larger amount of program information is made to be the master program frame. However, in the second exemplary embodiment, a program frame having a higher recommendation degree of a program instead of the amount of program information is made to be the master program frame. That is to say, in step S205 of the flow in accordance with the first exemplary embodiment shown in FIG. 2, instead of the amount of program information, the recommendation degree of a program is used preferentially.

Figure 6:
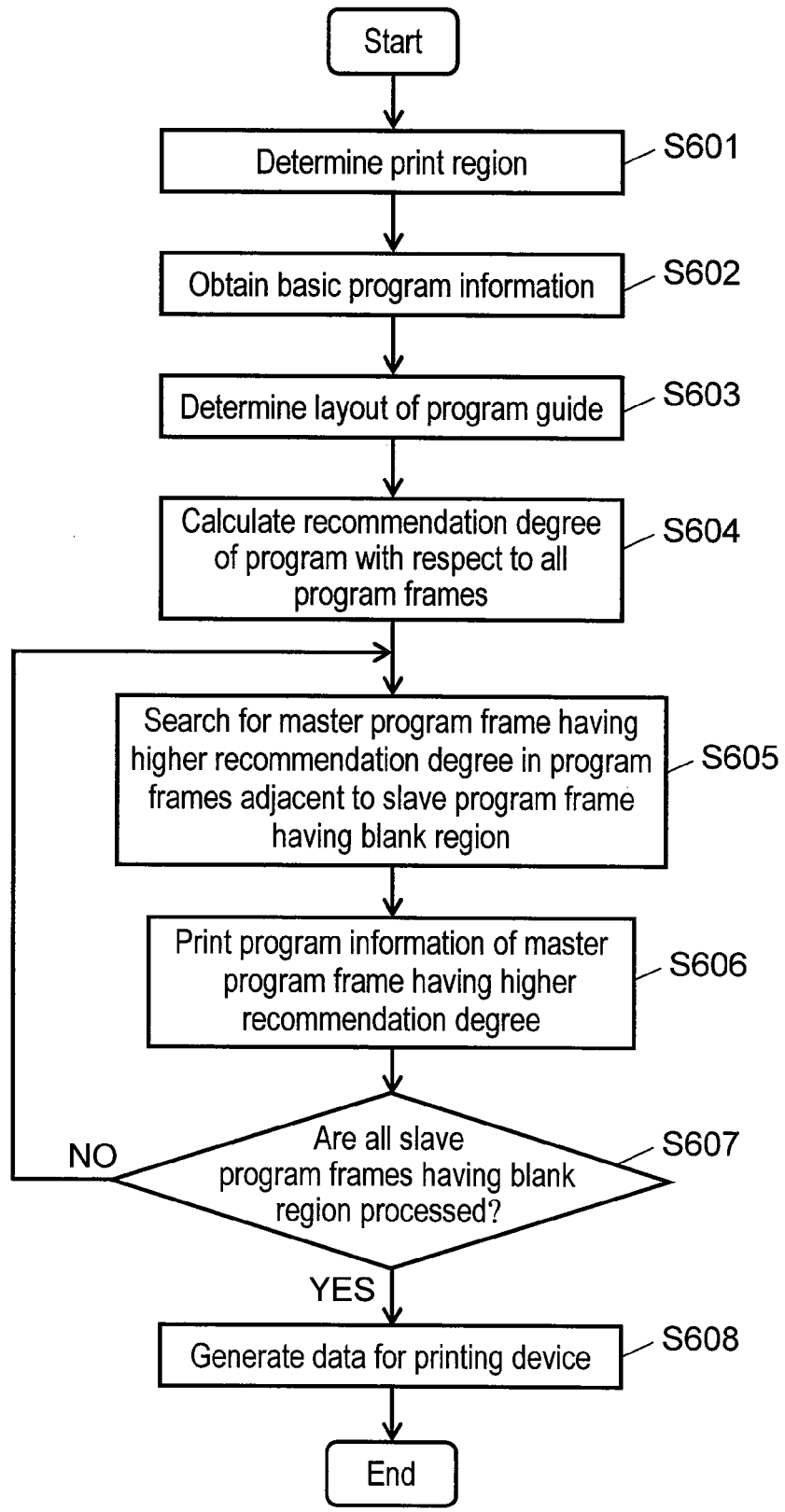
FIG. 6 is a flowchart showing a processing procedure of printing a program guide in accordance with the second exemplary embodiment of the present invention.

FIG. 6 is a flowchart showing the processing procedure of printing a program guide in accordance with the second exemplary embodiment of the present invention. In the flowchart of FIG. 6, since controls from step S601 to step S603 are the same as those from step S201 to step S203 of FIG. 2 described in the first exemplary embodiment, the detailed description thereof is omitted.

As already shown, printing control section 110 determines a layout of a program guide including a region of a display frame for displaying information of each program (S603). Then, preference judging section 501 calculates and provides the recommendation degree based on the preference information and the program information stored in storage section 106 (S604) with respect to all the program frames. Next, printing control section 110 searches for a program frame that is adjacent to the slave program frame having a blank region and that has a higher recommendation degree calculated by the preference judging section, and specifies it as the master program frame (S605).

After the master program frame is specified, program information of the master program frame is printed in the blank region of the slave program frame (S606). Herein, a program having the highest recommendation degree is specified as the master program frame. Therefore, the blank management structure is placed under the control of the master program frame. In this exemplary embodiment, for example, in printing, in order to show a state in which the blank region of the slave program frame is combined with the master program frame, a dividing line therebetween may not be printed. Furthermore, in order to show a state in which the blank region of the slave program frame is combined with the master program frame, a balloon may be used.

Next, it is determined whether or not the above-mentioned processing is carried out to all the slave program frames having a blank region (S607). In the case of "YES," data for the printing device are generated (S608). Then, printing control section 110 sends data for the printing device to printing device 111 so as to print a program guide. In the case of "NO," the processing procedure returns to step S605 and searches for a program frame adjacent to the slave program frame.

As mentioned above, printing control section 110 generates program guide print data for printing program information of a program of a program frame adjacent to the slave program frame having a blank region and having a higher recommendation degree calculated by preference judging section 501 in the blank region.

In this exemplary embodiment, program guide print data for printing program information of a program of a program frame adjacent to the slave program frame having a blank region and having a higher recommendation degree calculated by preference judging section 501 in the blank region are generated. However, printing control section 110 may not search for a program frame having a higher recommendation degree calculated by preference judging section 501 necessarily limited in the program frames adjacent to the slave program frame having a blank region.

That is to say, the program guide printing device includes tuner 101 for receiving and channel-selecting a broadcast wave; TS decoder 102 for decoding the broadcast wave channel-selected by tuner 101 and extracting program information; and storage section 106 for storing program information extracted in TS decoder 102. The program guide printing device includes printing control section 110 for generating and outputting program guide print data including a broadcasting time display frame for displaying a broadcasting time, a channel display frame for displaying each channel, and a program frame for displaying program information of each program, from program information stored in storage section 106. The program guide printing device further includes preference judging section 501 storing preference information generated from a viewing history in storage section 106, and calculating the recommendation degree of a program displayed in the program guide print data. Then, printing control section 110 may generate program guide print data for printing program information of another program frame in the slave program frame of program information whose recommendation degree calculated by preference judging section 501 is lower than the threshold value.

Thus, program information of a program suitable for user's preference can be displayed preferentially in a blank region or a program frame in which program information that is less useful to a user is printed, that is, a slave program frame of program information of a program whose recommendation degree is lower than the threshold value. Therefore, by displaying program information that is more useful to a user, it is possible to print a larger amount of useful information on a limited printing object such as paper.

Note here that the preference judging section may not necessarily search all the program frames. For example, it may search only limited program frames included in the program guide print data. Furthermore, it may be limited to program frames to be displayed. Thus, it is possible to shorten the time required for retrieval.

(Third Exemplary Embodiment)

A third exemplary embodiment of the present invention is described with reference to drawings. Since a configuration of a program guide printing device in accordance with the third exemplary embodiment of the present invention is the same as that in the second exemplary embodiment, the configuration is described with reference to the configuration diagram of FIG. 5. In the third exemplary embodiment, as in the second exemplary embodiment, the recommendation degree of each program with respect to a user is calculated by preference judging section 501. Then, by using the recommendation degree, program information of a program frame having a high recommendation degree is printed in a program frame having a blank region and a low recommendation degree. The control flow of the program guide printing device in this exemplary embodiment is described with reference to the flowchart of FIG. 7 and a configuration diagram of FIG. 5.

Figure 7:
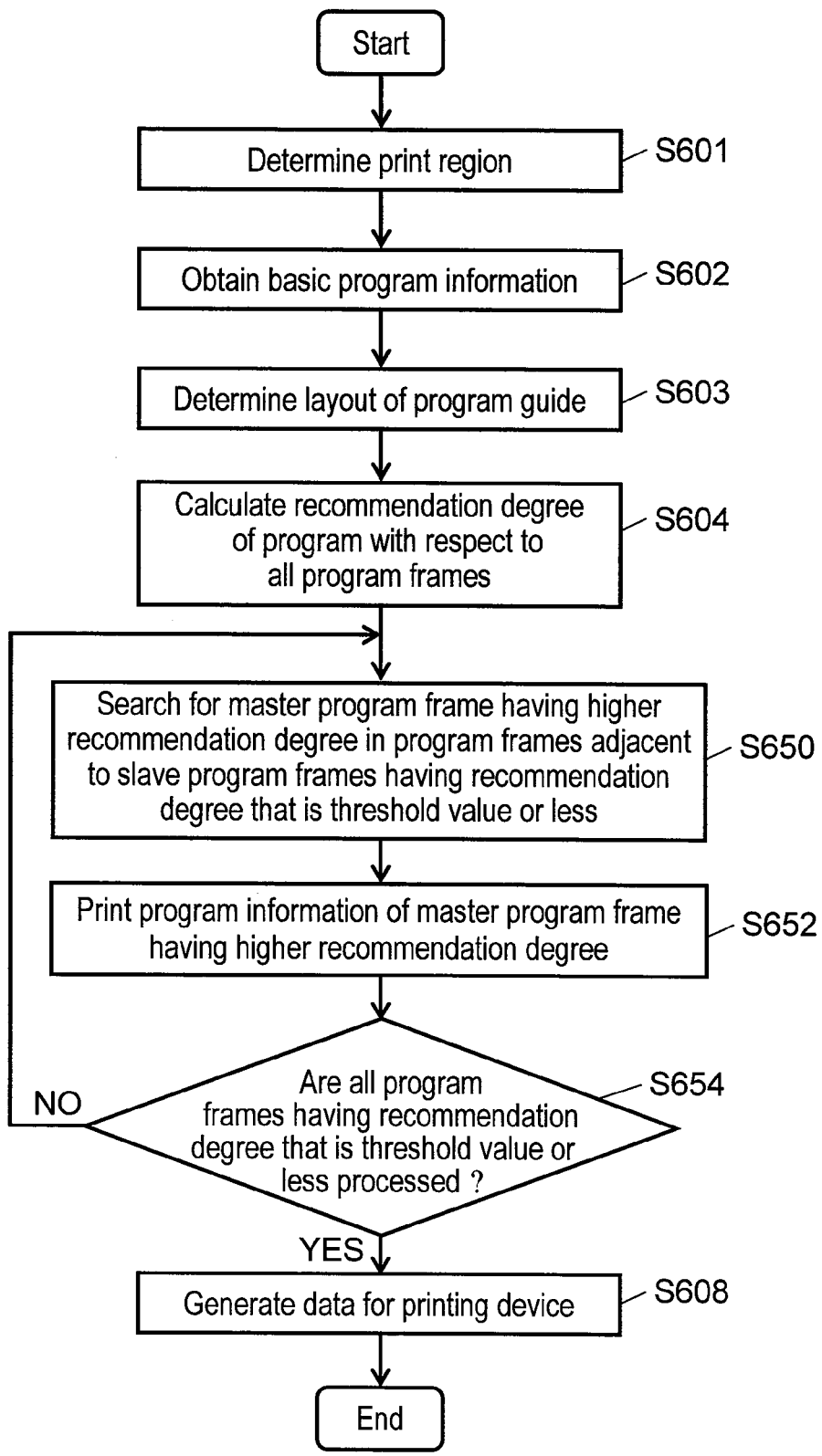
FIG. 7 is a flowchart showing a processing procedure of printing a program guide in accordance with the third exemplary embodiment of the present invention.

FIG. 7 is a flowchart showing a processing procedure of printing a program guide in accordance with the third exemplary embodiment of the present invention. In the flowchart shown in FIG. 7, since controls from step S601 to step S604 are the same as those from step S601 to step S604 of FIG. 6 described in the second exemplary embodiment, detailed description is omitted.

As already shown, preference judging section 501 calculates and provides the recommendation degree based on the preference information and the program information stored in storage section 106 (S604) with respect to all the program frames.

Subsequently, the threshold value of the recommendation degree (herein, for example, 50) at which the recommendation degree to a user is determined to be low is compared with the recommendation degree of each program frame, and then a program frame having a recommendation degree lower than the threshold value is determined to be a slave program frame.

Then, it retrieves a recommendation degree of the program frame adjacent to the program frame that is determined to be the slave program frame and searches for a program frame having a higher recommendation degree (S650). Note here that the threshold value at which the recommendation degree to a user is determined to be low may be a fixed value (herein, for example, 50) or may be a value decided by a user's operation. Among the searched program frames, a program frame having a higher recommendation degree is made to be a master program frame. Then, the program information of the master program frame is printed in the slave program frame (S652).

Next, the program guide printing device determines that all the program frames having a recommendation degree lower than the threshold value are slave program frames and judges whether or not they process program information as the master program frame (S654). With respect to a program frame having a recommendation degree lower than the threshold value, when a program frame that has not been determined to be a slave program frame is included (in the case of "NO"), the program frame is determined to be a slave program frame again and retrieving of an adjacent program frame is carried out (S650). On the other hand, with respect to the program frame having a recommendation degree lower than the threshold value, when a program frame that has not been determined to be a slave program frame is not included (in the case of "YES"), the processing procedure proceeds to the following flow.

After the above-mentioned flow, with respect to the program frames having a recommendation degree lower than the threshold value, when a program frame that has not been determined to be a slave program frame is not included, data for a printing device are generated (S608) and the data are sent to the printing device so as to be printed.

As mentioned above, when the recommendation degree of a program calculated by preference judging section 501 is lower than the threshold value, printing control section 110 generates program guide print data for printing program information of a program in the adjacent program frame and having a higher recommendation degree in a slave program frame of a program having a recommendation degree lower than the threshold value.

In this exemplary embodiment, when the recommendation degree of a program calculated by preference judging section 501 is lower than the threshold value, printing control section 110 searches for program information having a higher recommendation degree from programs in the adjacent program frame. However, it may not search for program information having a higher recommendation degree necessarily in the limited programs in the adjacent program frame.

That is to say, in the program guide printing device, when the recommendation degree of a program calculated by preference judging section 501 is lower than the threshold value, printing control section 110 may generate program guide print data for printing the program information having a higher recommendation degree in the slave program frame having a recommendation degree lower than a threshold value.

This makes it possible to preferentially print program information of a program suitable for user's preference in a program guide of a program that is different from the user's preference. Therefore, by printing program information that is more useful to a user, it is possible to print a larger amount of useful information on a limited printing object such as paper.

Note here that the preference judging section may not search necessarily all program frames. For example, it may search only program frames included in the program guide print data to be printed. Furthermore, it may search only the program frames to be displayed. Thus, it is possible to shorten the time required for retrieval.

(Fourth Exemplary Embodiment)

A fourth exemplary embodiment of the present invention is described with reference to drawings. Since a configuration of a program guide printing device in accordance with the fourth exemplary embodiment of the present invention is the same as that described with reference to FIG. 5 in the second exemplary embodiment, the description thereof is omitted. From the first to third exemplary embodiments, the combination of the master program frame and the blank region or the slave program frame is expressed by not printing a dividing line therebetween. However, in this exemplary embodiment, it is expressed by using a balloon. With this expression, a user can grasp the master-slave relation between the program frames intuitively.

This expression is described with reference to the conceptual diagrams shown in FIGS. 4A and 4C. FIG. 4C is a conceptual diagram showing program guide printed image 464 in which the combination of the adjacent program frames is expressed by using balloon 408. In program guide printed image 460 shown in FIG. 4A, slave program frame 401 is subordinate to master program frame 402. Therefore, blank region 403 is used for printing program information of master program frame 402. Thus, printing control section 110 prints program information in a blank region by using balloon 408.

In the fourth exemplary embodiment, master program frame 402 shown in program guide printed image 460 of FIG. 4A is a starting point of balloon 408 as shown in program frame 407 in program guide printed image 464 of FIG. 4C. Blank region 403 shown in program guide printed image 460 is a displayed region whose starting point is program frame 407 as shown in balloon 408 in program guide printed image 464.

As mentioned above, printing control section 110 prints program information in a blank region by using balloon 408. Printing control section 110 generates program guide print data in which a starting point of balloon 408 is located on the program frame showing program information to be printed in the blank region. Therefore, a user can easily judge that information related to program frame 407 is displayed.

In this exemplary embodiment, the combination of the adjacent program frames is expressed by using balloon 408. However, the program frames to be combined are not necessarily adjacent to each other. That is to say, even when the program frames to be combined are not adjacent to each other, printing control section 110 may generate program guide print data for printing program information in a slave program frame by using a balloon in which the starting point of the balloon is located on a program frame showing program information to be printed in a blank region.

Note here that the preference judging section may not search necessarily all program frames. For example, it may search only program frames included in the program guide print data to be printed. Furthermore, it may search only program frames to be displayed. Thus, it is possible to shorten the time required for retrieval.

(Fifth Exemplary Embodiment)

A fifth exemplary embodiment of the present invention is described with reference to drawings. In the fourth exemplary embodiment, in order to express the master-slave relation between program frames, a balloon is used. However, this exemplary embodiment is different from the fourth exemplary embodiment in that the background color of program frames is made to be the same in order to express the relation between program frames intuitively. The description of the same configurations and operations as those in the fourth exemplary embodiment is omitted.

Figure 8B:
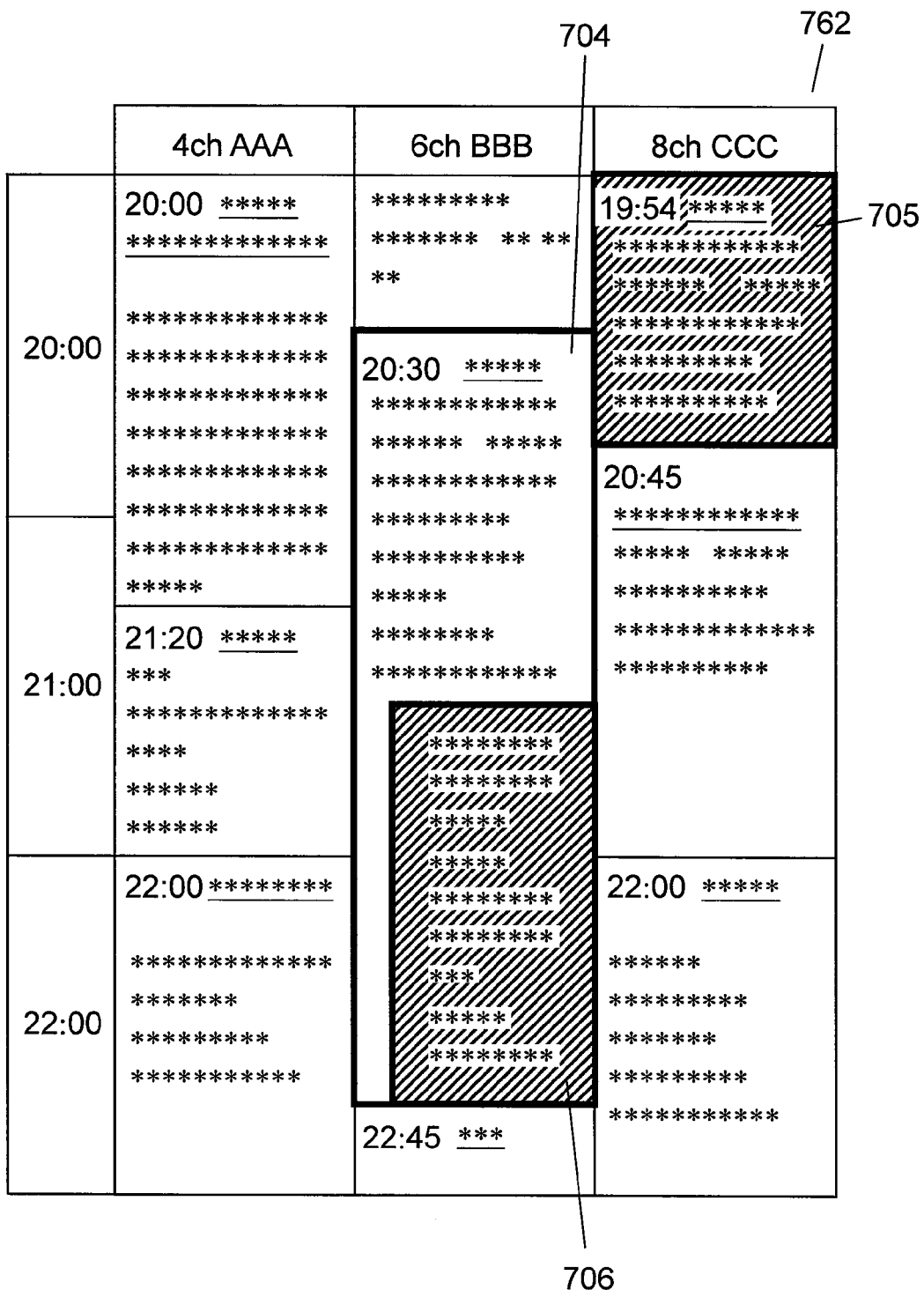
FIG. 8B is a conceptual diagram showing a program guide printed image in which the program frames are provided with the same background color in accordance with the fifth exemplary embodiment of the present invention.

FIGS. 8A and 8B are conceptual diagrams to illustrate program guide printed images 760 and 762 in which the program frames are provided with the same background color. FIG. 8A is a conceptual diagram showing program guide printed image 760 before program frames are related to each other. Firstly, the configuration is described specifically with reference to FIG. 8A.

In FIG. 8A, program frame 701 includes blank region 703. Furthermore, program frame 701 is subordinate to program frame 702. The program information of program frame 702 is printed in blank region 703.

FIG. 8B is a conceptual diagram showing program guide printed image 762 in which program frames are provided with the same background color. As shown in FIG. 8B, printing control section 110 paints blank region 703 and program frame 702 in FIG. 8A with the same background color that is a different color from that of the other frames. Thus, the relation between blank region 703 and program frame 702 as well as the non-relation between blank region 703 and program frame 702 and other program frames can be shown easily. In program frame 705, program information similar to that of program frame 702 is printed. Furthermore, in blank region 703, program information of a program printed in program frame 705 is printed as shown in blank region 706.

As mentioned above, when program information is printed in a blank region, printing control section 110 generates program guide print data for making the background color of the blank region be the same as the background color of the program frame showing the program of the program information to be printed in the blank region.

This exemplary embodiment describes the adjacent program frames but not always is limited to the adjacent program frames. That is to say, even if the program frames are not adjacent to each other, when program information is printed in a slave program frame, printing control section 110 generates program guide print data for making the background color of the slave program frame be the same as the background color of the program frame showing the program of the program information to be printed in the slave program frame.

Thus, when program information corresponding to the program of another program frame is printed in a blank region, the program information shown in the blank region and the related program can be recognized easily.

(Sixth Exemplary Embodiment)

Figure 9:
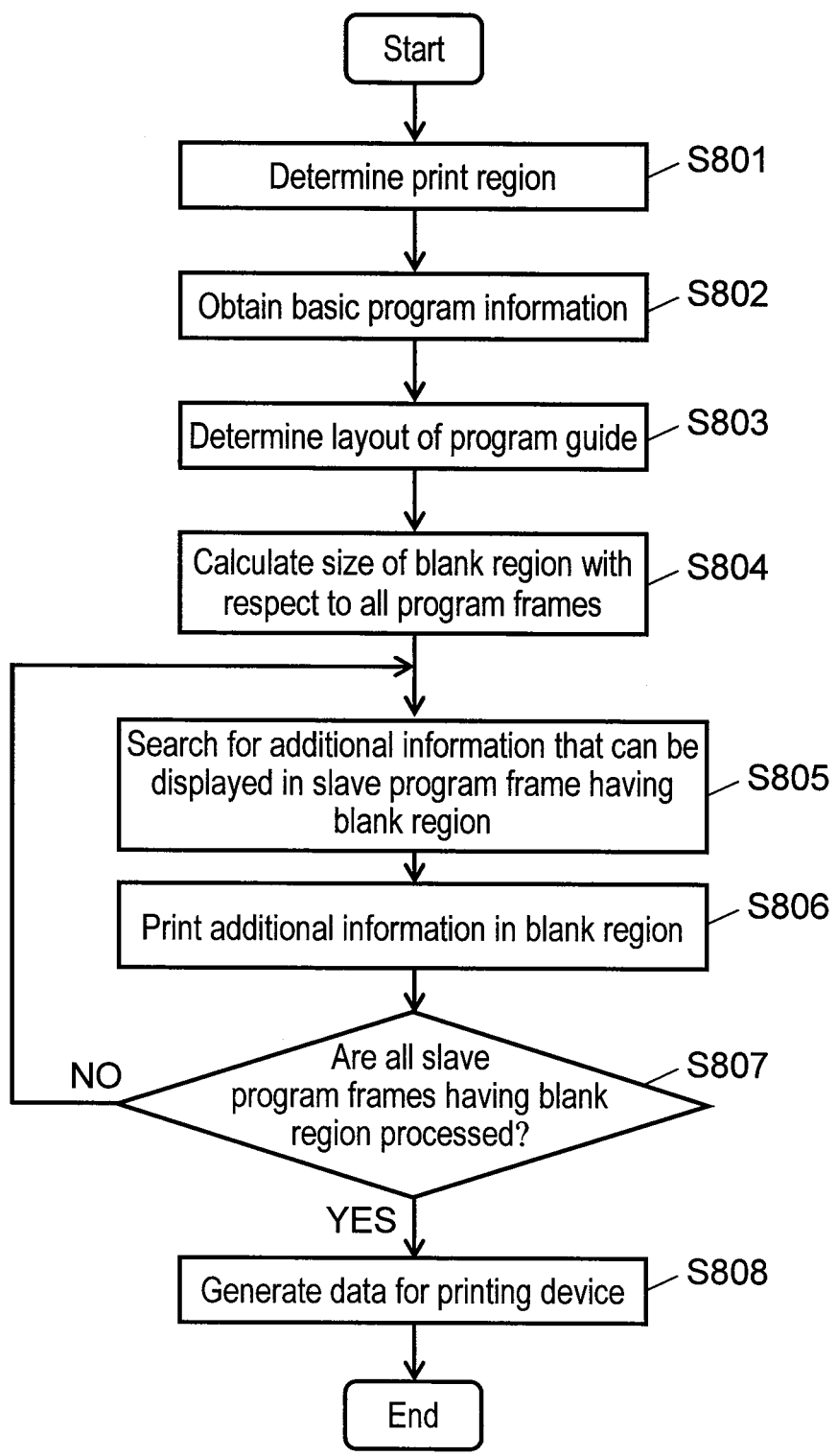
FIG. 9 is a flowchart showing a processing procedure of printing a program guide in accordance with a sixth exemplary embodiment of the present invention.

A sixth exemplary embodiment of the present invention is described with reference to drawings. A program guide printing device in accordance with the sixth exemplary embodiment of the present invention is characterized in that image data are printed in a slave program frame having a blank region. Since the configuration of the program guide printing device in this exemplary embodiment is the same as in the second exemplary embodiment shown with respect to FIG. 5, the description thereof is omitted. FIG. 9 is a flowchart showing a processing procedure of printing a program guide in accordance with the sixth exemplary embodiment of the present invention. An operation flow of this exemplary embodiment is described with reference to the flowchart of FIG. 9.

Since controls from step S801 to step S804 are the same as those from step S201 to step S204 described in the first exemplary embodiment, the description thereof is omitted.

The program guide printing device searches all the slave program frames having a blank region for data capable of inserting from the additional information as image data to be displayed in a blank region accumulated in storage section 106 (S805). An example of the additional information can include advertisement image information, program topics, weathercast, and the like. When the additional information that can be inserted is present, additional information is inserted and printed in a blank region of a slave program frame having a blank region (S806). Then, it is determined whether or not the processing is completed with respect to all the slave program frames (S807). As a result, when the processing are not completed (in the case of "NO"), the processing procedure returns to step S805. When all the processing procedures are completed (in the case of "YES"), data for the printing device are generated (S808). Then, the data are sent to the printing device.

As mentioned above, storage section 106 further stores image data, and printing control section 110 prints image data in the slave program frames having a blank region.

This exemplary embodiment describes adjacent program frames as an example, but it is not limited to the adjacent program frames. That is to say, even if the program frames are not adjacent to each other, the storage section further stores image data and the printing control section may print image data in the slave program frame.

Thus, in a blank region, additional information related to the program frame having the blank region can be printed. Therefore, it is possible to print a larger amount of useful information on a limited printing object such as paper.

(Seventh Exemplary Embodiment)

A seventh exemplary embodiment of the present invention is described with reference to drawings. In the first to third exemplary embodiments, with respect to master program frame, a slave program frame is selected from the adjacent program frames. However, in the seventh exemplary embodiment, the master program frame and the slave program frame that are not adjacent to each other are determined. The combination state of these program frames is realized by expression by using a balloon as in the fourth exemplary embodiment or by expression by using the same background color in the program frames as in the fifth exemplary embodiment. Since the configuration of the program guide printing device in the seventh exemplary embodiment is the same as that in the first exemplary embodiment and described with reference to FIG. 5, the description thereof is omitted.

Figure 10B:
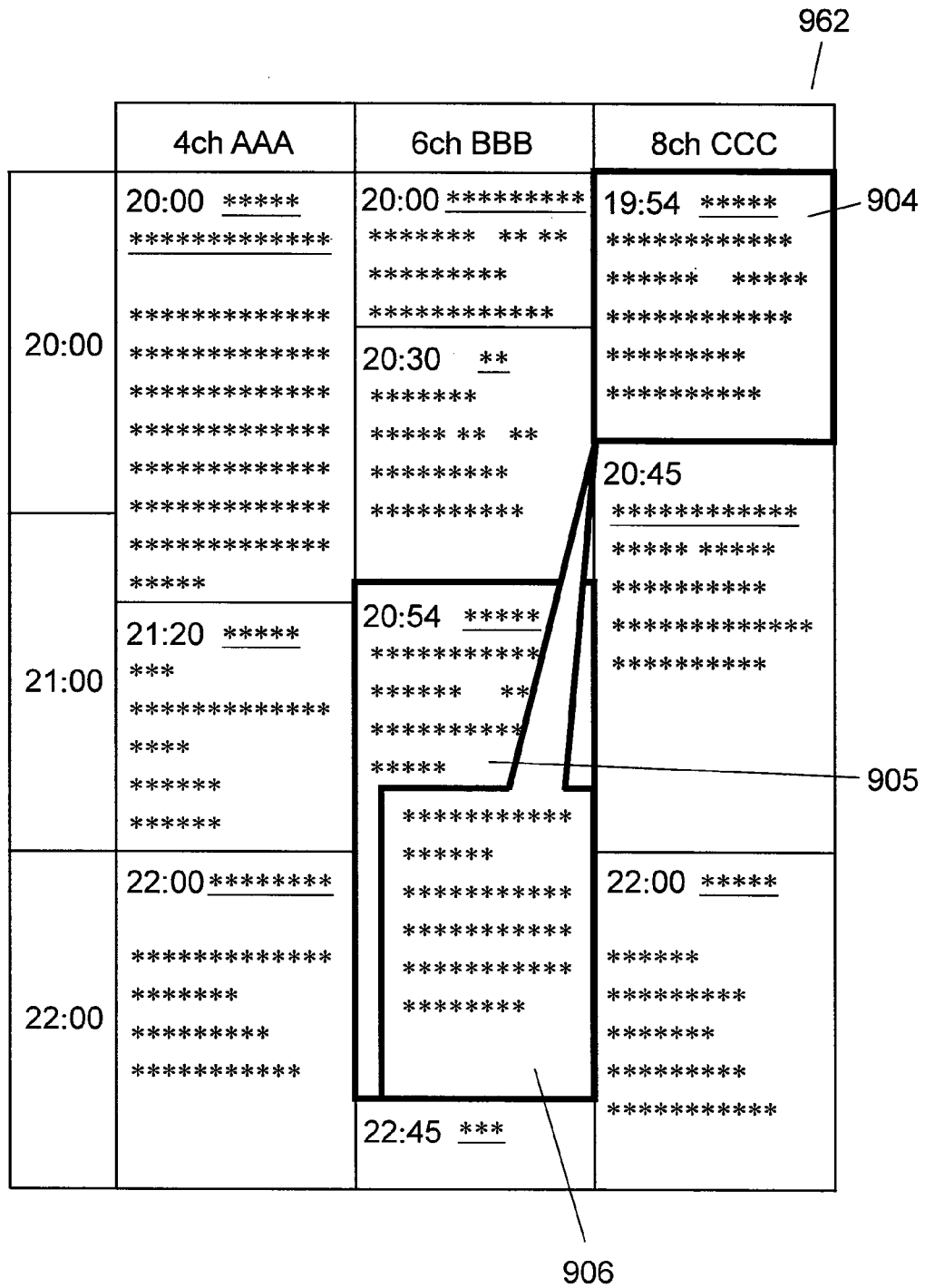
FIG. 10B is a conceptual diagram of a program guide printed image in which program frames that are apart from each other are related by using a balloon.

FIG. 10A is a conceptual diagram of program guide printed image 960 in which program frames to be related 901 and 902 are apart from each other. In FIG. 10A, program frame 902 includes blank region 903 and program information of program frame 902 is printed. FIG. 10B is a conceptual diagram of program guide printed image 962 in which program frames that are apart from each other are related to each other by using a balloon.

FIG. 10B is expressed by using a balloon and program frame 901 of FIG. 10A is a starting point of the balloon as shown in program frame 904 of FIG. 10B. Blank region 903 of FIG. 10A is displayed as balloon 906 for printing program information as shown in FIG. 10B.

Figure 10C:
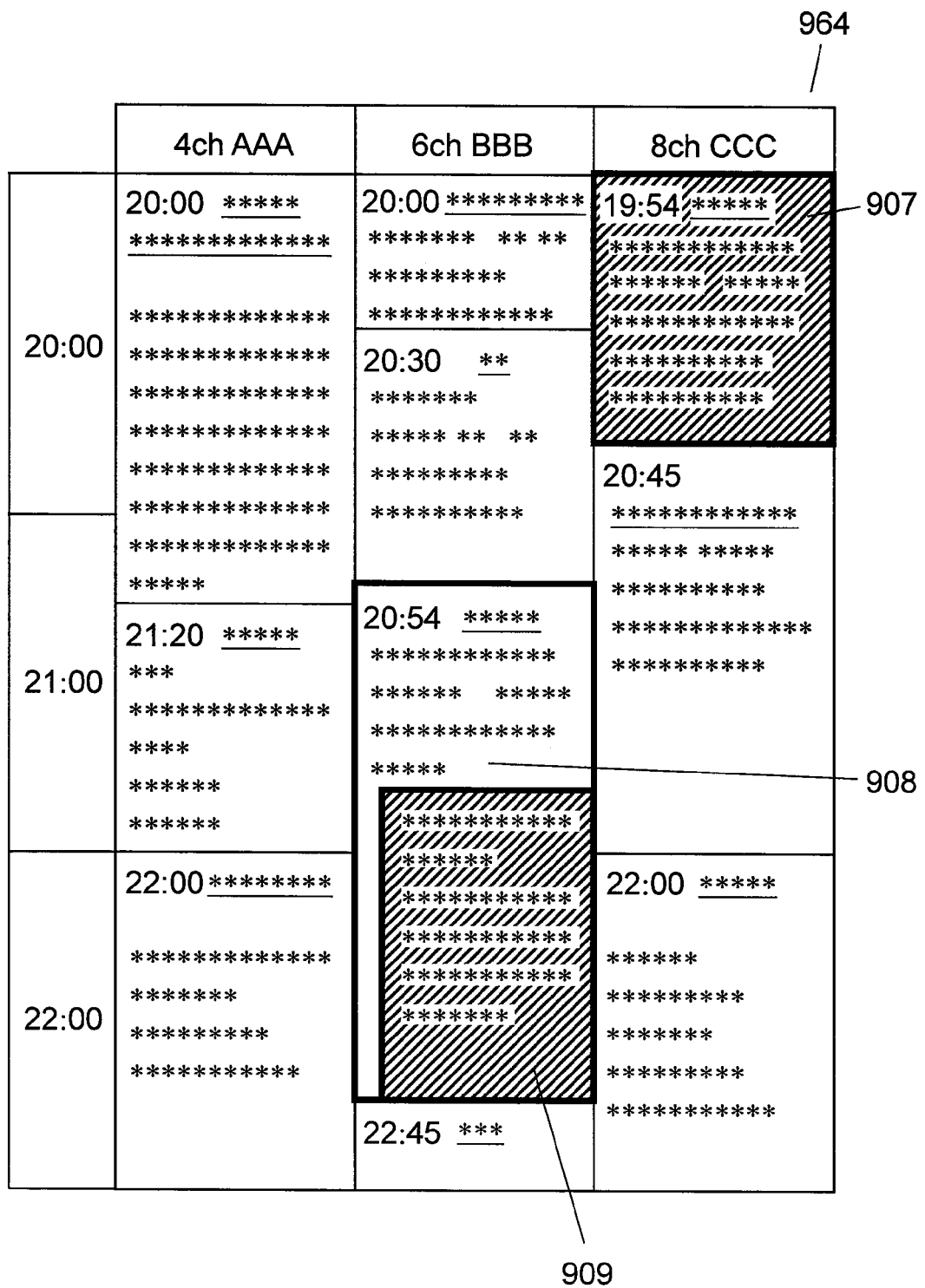
FIG. 10C is a conceptual diagram of a program guide printed image in which program frames that are apart from each other are related by using the same background color.

FIG. 10C is a conceptual diagram of a program guide printed image 964 in which program frames that are apart from each other are related to each other by using the same background color. FIG. 10C expresses the relating of the frames by using the same background color; program frame 901 of FIG. 10A is painted with a certain background color as shown in program frame 907. Furthermore, blank region 903 of FIG. 10A is also painted with the same color as that of program frame 907 as shown in blank region 909 of FIG. 9C. In this state, the program information of program frame 901 is printed.

As mentioned above, printing control section 110 may generate program guide print data for printing program information of a master program frame having a larger amount program information in a blank region of a slave program frame having the blank region.

Furthermore, storage section 106 further includes preference judging section 501 for calculating the recommendation degree of a program to be displayed in program guide print data. Storage section 106 stores preference information generated from a viewing history. Printing control section 110 may generate program guide print data for printing program information having a higher recommendation degree calculated by preference judging section 501 in a blank region of the slave program frames having the blank region.

Furthermore, when the recommendation degree of a program calculated by preference judging section 501 is lower than the threshold value, printing control section 110 may generate program guide print data for printing program information having a higher recommendation degree in the slave program frame of a program having a recommendation degree lower than the threshold value.

Thus, even in the blank regions of the program frames that are not adjacent to each other, program information can be printed. Therefore, it is possible to print a larger amount of useful information on a limited printing object such as paper.

(Eighth Exemplary Embodiment)

An eighth exemplary embodiment of the present invention is described with reference to drawings. This exemplary embodiment is different from the first exemplary embodiment in that in this exemplary embodiment, in a margin or the reverse side, that is, a portion other than the program guide to be printed, specific program information or additional information is added. Since a configuration of a program guide printing device in accordance with the eighth exemplary embodiment of the present invention is the same as that in the first exemplary embodiment and described with reference to FIG. 5, the description thereof is omitted.

When a user prints a program guide, the user can designate the number of channels and a time slot of the program guide to be printed. However, when an area of the program guide to be printed on a printing object (printer paper, and the like) is small, a margin occurs. Printing control section 110 holds information relating to an area of the printing object in advance. In this case, when a margin occurs as a result of comparison with the area of the program guide to be printed, by using the size of the program information or the recommendation degree of the program as in the first or second exemplary embodiment, the information is determined to be useful to a user and the information is printed in the margin. The relating to the program frame can be expressed by using a balloon as shown in the fourth exemplary embodiment, or by expressing with a background color as shown in the fifth exemplary embodiment. That is to say, printing control section 110 may generate program guide print data in which program information is described in a margin part.

Figure 11A:
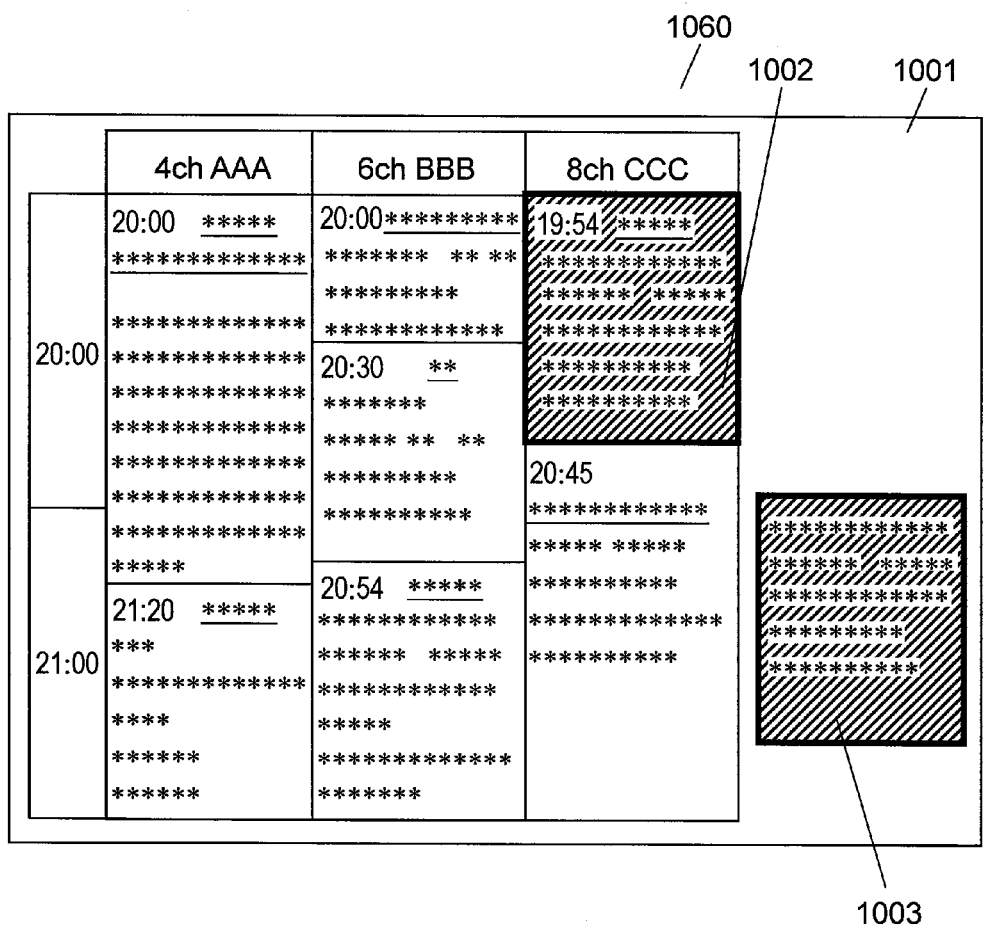
FIG. 11A is a conceptual diagram of a program guide printed image in which program information is added in a blank region of a printing object.

The printing result is described with reference to a conceptual diagram shown in FIG. 11A. FIG. 11A is a conceptual diagram showing a program guide printed image 1060 in which program information is added in a blank region of the printing object. As shown in FIG. 11A, program frame 1002 of a program that is higher useful to a user is printed in printing object 1001. At this time, program information of program frame 1002 is printed in program frame 1003 provided to print program information of program frame 1002. Program frame 1003 is originally a margin region but it is newly printed information in this exemplary embodiment. Furthermore, program frame 1003 may be additional information.

Figure 11B:
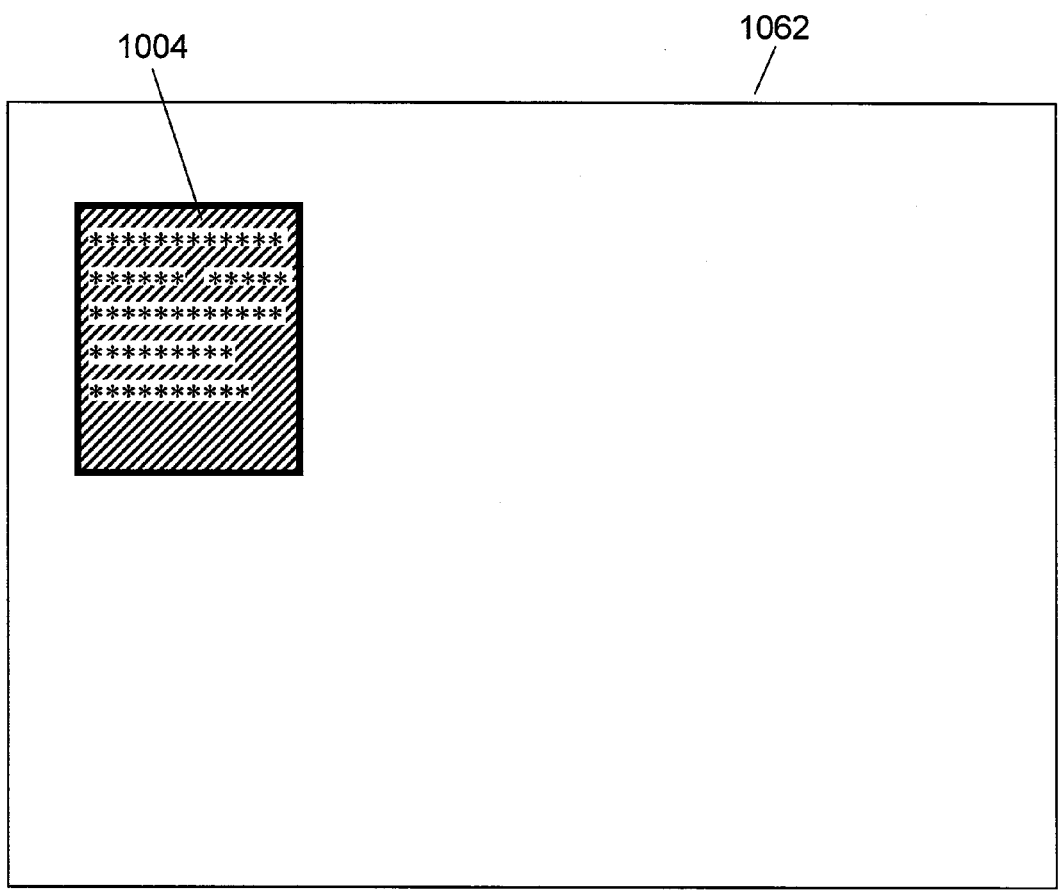
FIG. 11B is a conceptual diagram of a program guide printed image in which program information is added in a reverse side of a printing object.

Furthermore, it is possible to provide program frame 1003 on the reverse side of the printing object. FIG. 11B is a conceptual diagram showing program guide printed image 1062 in which program information is added in a reverse side of the printing object. FIG. 11B shows the reverse side of the printing object, and FIG. 11A is printed on the front surface thereof. Program information of program frame 1002 is described in program frame 1004 and the relating can be expressed by the background color as shown in the fifth exemplary embodiment.

Thus, it is possible to print program information in a margin in which a program guide is not printed or on the reverse side of a printing object. Therefore, it is possible to print a larger amount of useful information on a limited printing object such as paper.

(Ninth Exemplary Embodiment)

A ninth exemplary embodiment of the present invention is described with reference to drawings. In a program guide printing device of this exemplary embodiment, preference judging section 501 calculates the recommendation degree of each program to a user similar to the second exemplary embodiment. Then, by using the recommendation degree, program information of a program frame having a higher recommendation degree is printed in a program frame having low recommendation degree that does not have a blank region. Since the configuration of the program guide printing device in accordance with the ninth exemplary embodiment of the present invention is the same as that in the second exemplary embodiment, the configuration is described with reference to the configuration diagram of FIG. 5. However, the configuration is the same, the detailed description is omitted. The control flow of the program guide printing device in this the exemplary embodiment is described with reference to the flowchart shown in FIG. 12 and conceptual diagrams of program guide printed images 1250, 1262, and 1264 shown in FIGS. 13A, 13B and 13C.

Figure 12:
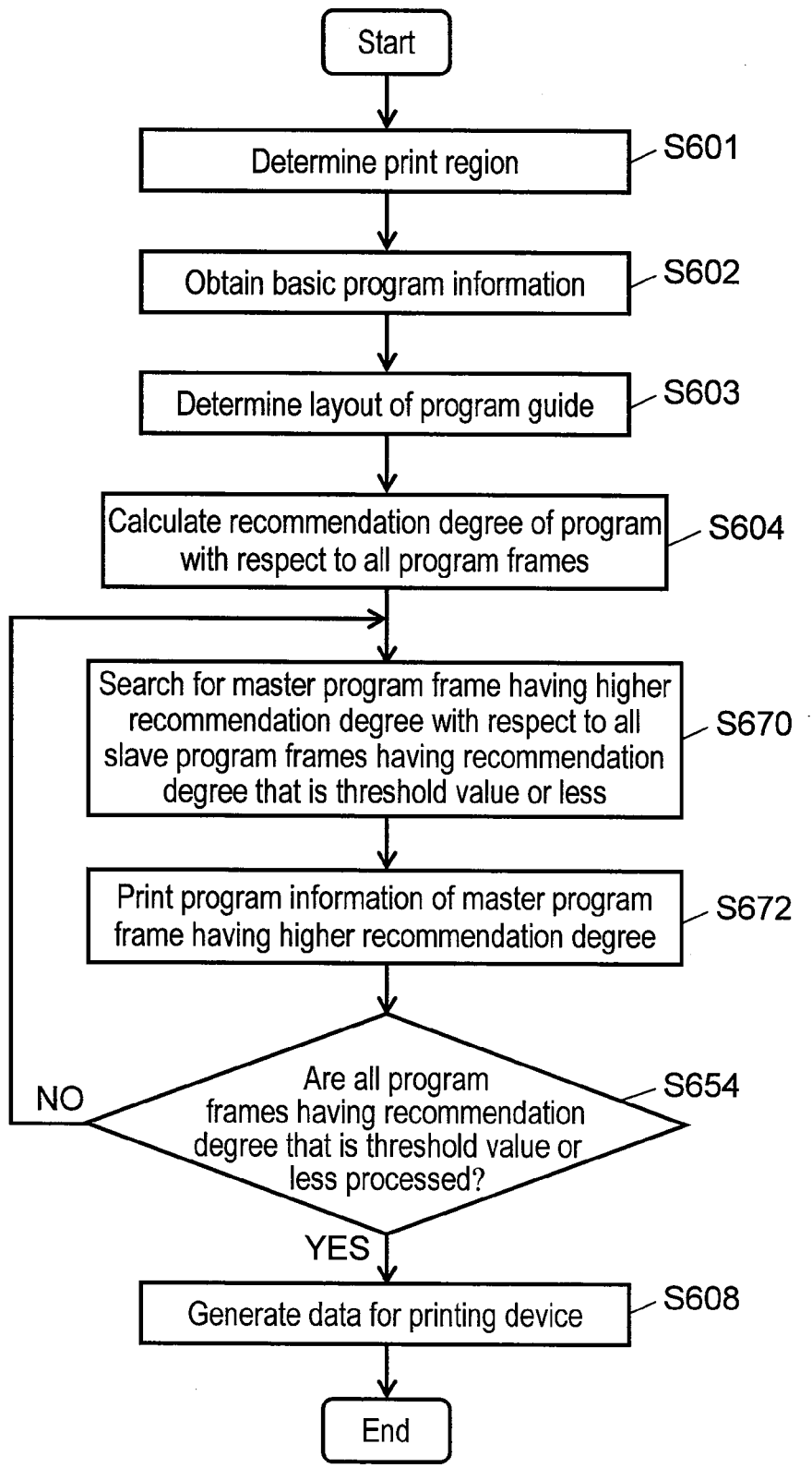
FIG. 12 is a flowchart showing a processing procedure of printing a program guide in accordance with a ninth exemplary embodiment of the present invention.

FIG. 12 is a flowchart showing a processing procedure of printing a program guide in accordance with the ninth exemplary embodiment of the present invention. In the flowchart shorn in FIG. 12, since controls from step S601 to step S604 are the same as those from step S601 to step S604 of FIG. 6 described in the second exemplary embodiment, detailed description is omitted.

As already shown, preference judging section 501 calculates and provides the recommendation degree based on the preference information and the program information stored in storage section 106 (S604) with respect to all the program frames.

Subsequently, the threshold value of the recommendation degree (herein, for example, 50) at which the recommendation degree to a user is determined to be low is compared with the recommendation degree of each program frame, and then a program frame having a recommendation degree lower than the threshold value is determined to be a slave program frame. Then, by retrieving for the recommendation degree of another program frame, a master program frame having a high recommendation degree is searched (S670). Among the searched program frames, program information of the master program frame having a higher recommendation degree is printed in the slave program frame (S672). The threshold value at which the recommendation degree to a user is judged to be low may be a fixed value (herein, for example, 50) or a value determined by a user's operation.

Next, it is determined whether or not the above-mentioned processing procedure is carried out with respect to all the program frames in which the recommendation degree is the threshold value or less (S654). When the above-mentioned processing procedure is carried out (in the case of "YES"), the data for the printing device are generated (S608). Then, the data are sent to the printing device and a program guide is printed. When the above-mentioned processing procedure is not carried out (in the case of "NO"), the processing procedure returns to step S670 and a master program frame having a high recommendation degree is searched with respect to the slave program frame in which the recommendation degree is the threshold value or less. At this time, already searched master program frame is excluded.

Figure 13B:
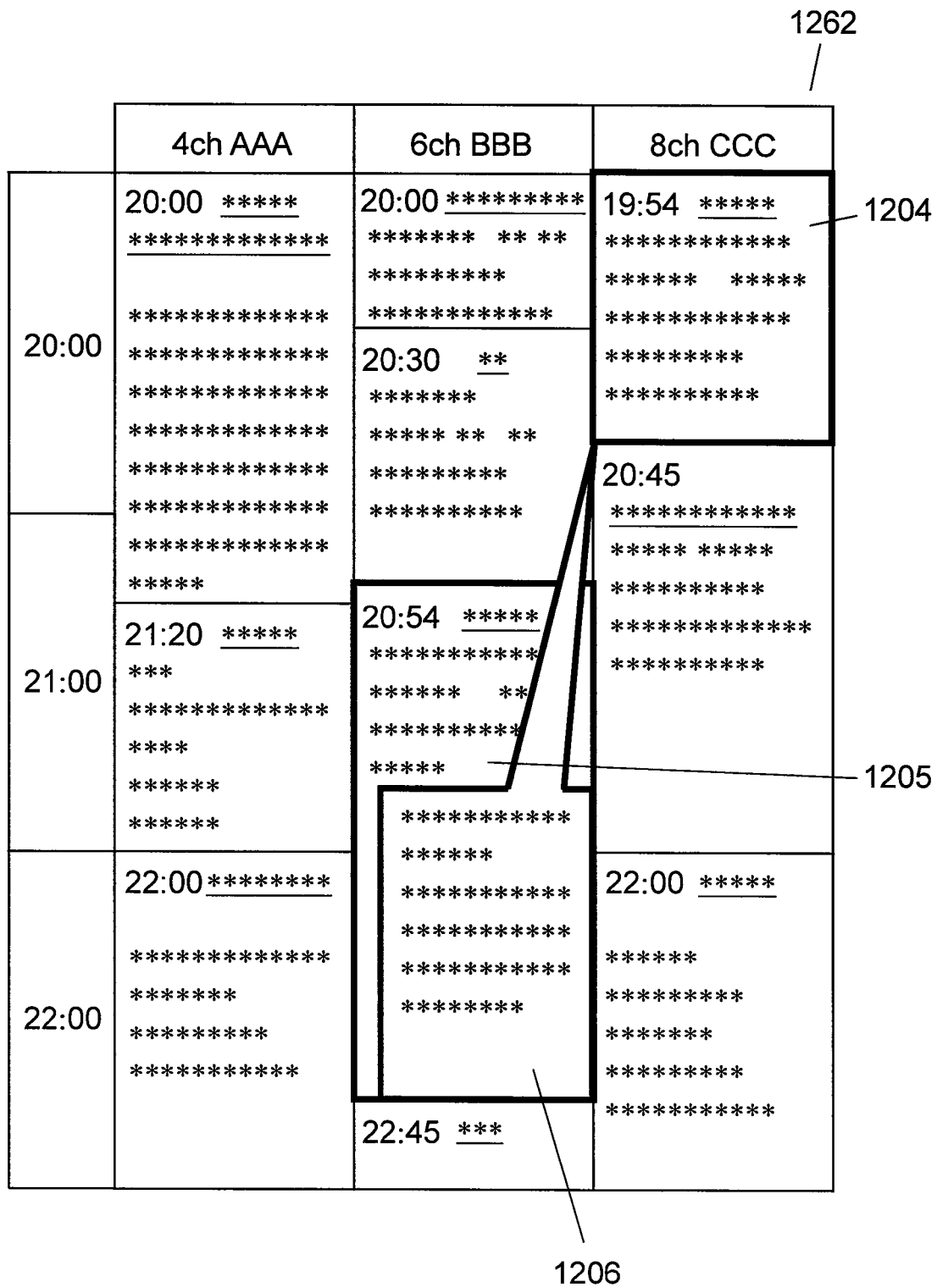
FIG. 13B is a conceptual diagram of a program guide printed image in which program frames that are apart from each other are related by using a balloon.
Figure 13C:
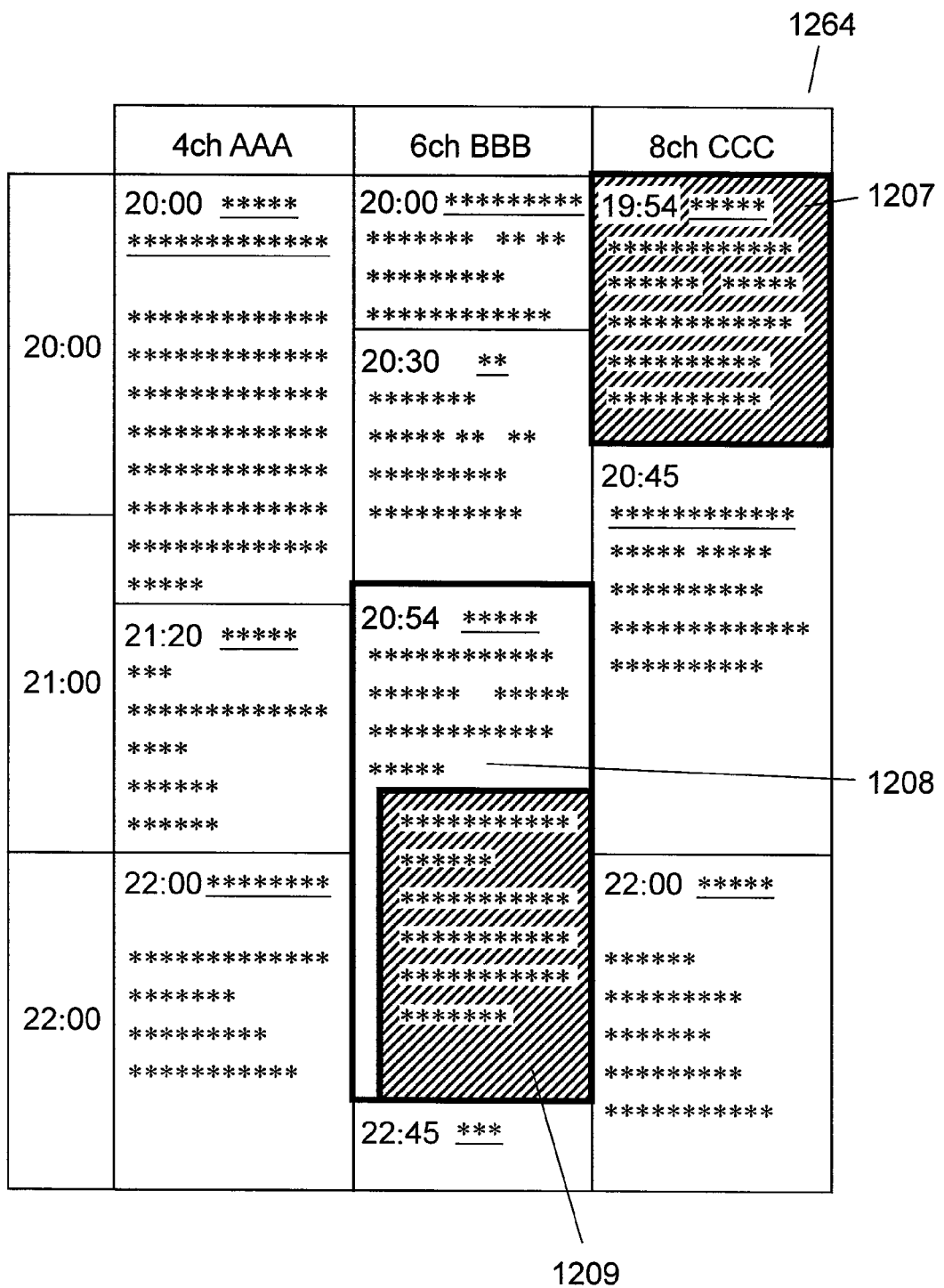
FIG. 13C is a conceptual diagram of a program guide printed image in which program frames that are apart from each other are related by using the same background color.

A state in which the slave program frame is combined with the master program frame may be expressed by using balloon 1206, for example, as shown in FIG. 13B. Furthermore, as shown in FIG. 13C, printing control section 110 paints master program frame 1207 and partial region 1209 of program frame 1208 with the same color and the color is different from a background color of the other program frames. Thus, the relation between program frame 1207 and partial region 1209 and the non-relation between partial region 1209 and program frame 1208 and other program frames can be shown easily.

As shown in FIG. 13A, this exemplary embodiment describes a case in which the slave program frame and the master program frame are not adjacent to each other. However, the exemplary embodiment can be carried out in the case where the slave program frame and the master program frame are adjacent to each other. In this case, as already shown, the relation between both the frames may be expressed by not printing a dividing line between the frames.

Note here that the preference judging section may not search necessarily all program frames. For example, it may search only program frames included in the program guide print data to be printed. Furthermore, it may search only the program frames to be displayed. Thus, it is possible to shorten the time required for retrieval.

INDUSTRIAL APPLICABILITY

A program guide printing device of the present invention can print information that is more useful to a user in a printing object having the same size as a conventional one. In particular, it is useful in a receiving device and the like having a receiving function of program information.

The invention claimed is:
1. A program guide printing device, comprising:
a tuner for receiving and channel-selecting a broadcast wave;
a TS decoder for decoding the broadcast wave channel-selected by the tuner and extracting program information for audio-video programs;
a storage section which includes memory for storing the program information extracted by the TS decoder; and
a printing control section which includes a microprocessor for generating and outputting program guide print data the program guide print data including,
a plurality of first program frames arranged over a first time period in a first area associated with a first channel, said plurality of first program frames displaying program information of a respective plurality of first audio-video programs available from the first channel over the first time period,
a plurality of second program frames arranged over a second time period in a second area associated with a second channel, said plurality of second program frames displaying program information of a respective plurality of second audio-video programs available from the second channel over said second time period,
wherein, for one of said second audio-video programs which is available on said second channel at said second time period and different from one of said first audio-video programs available on said first channel at said first time period, a) a portion of said program information for said one of said second audio-video programs is displayed in one of the second program frames in said second area and b) a remaining portion of said program information for said one of said second audio-video programs is displayed in a blank portion of one of the first program frames of said one of said first audio-video programs in said first area.
2. The program guide printing device of claim 1, further comprising:
a preference judging section for calculating a recommendation degree of a program displayed in the program guide print data, wherein the storage section stores preference information generated from a viewing history, and the printing control section generates program guide print data for printing program information of the program based on the recommendation degree calculated by the preference judging section.

3. The program guide printing device of claim 1, wherein when the printing control section displays program information in the blank region, the printing control section generates program guide print data for printing the program information by using a balloon in which a starting point of the balloon is located on one of the plurality of second program frames.

4. The program guide printing device of claim 1, wherein the storage section further stores image data, and the printing control section prints the image data in the slave program frame having the blank portion.

5. The program guide printing device of claim 1, wherein when the printing control section prints program information in the blank portion, the printing control section generates program guide print data for printing the program information by making a background color of the blank portion to be the same as a background color of the second area displaying the program information.

6. The program guide printing device of claim 1, further comprising:

a preference judging section for storing preference information generated from a viewing history in the storage section, and calculating the recommendation degree of a program to be displayed in the program guide print data, wherein the printing control section generates program guide print data for printing program information of another program frame in a slave program frame of a program having a recommendation degree lower than a threshold value calculated by the preference judging section.

7. A method of printing a program guide using a program guide printing device comprising:

a tuner for receiving and channel-selecting a broadcast wave;

a TS decoder for decoding the broadcast wave channel-selected by the tuner and extracting program information;

a storage section which includes memory for storing the program information extracted by the TS decoder; and a printing control section which includes a microprocessor for generating and outputting program guide print data, the program guide print data including a plurality of first program frames arranged over a first time period in a first area associated with a first channel, said plurality of first program frames displaying program information of a respective plurality of first audio-video programs available from the first channel over the first time period, a plurality of second program frames arranged over a second time period in a second area associated with a second channel, said plurality of second program frames displaying program information of a respective plurality of second audio-video programs available from the second channel over said second time period, wherein, for one of said second audio-video programs which is available on said second channel at said second time period and different from one of said first audio-video programs available on said first channel at said first time period, a) a portion of said program information for said one of said second audio-video programs is displayed in one of second program frames in said second area and b) a remaining portion of said program information for said one of said audio-video programs is displayed in a blank portion of one of the first program frames of said one of said first audio-video programs in said first area.

8. A method of printing a program guide using a program guide printing device comprising:

a tuner for receiving and channel-selecting a broadcast wave;

a TS decoder for decoding the broadcast wave channel-selected by the tuner and extracting program information;

a storage section which includes memory for storing the program information extracted by the TS decoder;

a printing control section which includes a microprocessor for generating and outputting program guide print data, the program guide print data including a plurality of first program frames arranged over a first time period in a first area associated with a first channel, said plurality of first program frames displaying program information of a respective plurality of first audio-video programs available from the first channel over the first time period, a plurality of second program frames arranged over a second time period in a second area associated with a second channel, said plurality of second program frames displaying program information of a respective plurality of second audio-video programs available from the second channel over said second time period, wherein, for one of said second audio-video programs which is available on said second channel at said second time period and different from one of said first audio-video programs available on said first channel at said first time period, a) a portion of said program information for said one of said second audio-video programs is displayed in one of the second program frames in said second area and b) a remaining portion of said program information for said one of said second audio-video programs is displayed in a blank portion of one of the first program frames of said one of said first audio-video programs in said first area; and a preference judging section for storing preference information generated from a viewing history in the storage section, and calculating a recommendation degree of a program to be displayed in the program guide print data, wherein the printing control section generates program guide print data for printing program information of another program frame into the first program frame of program information of a program having a recommendation degree lower than a threshold value calculated by the preference judging section.

* * * * *